US008577868B1

(12) United States Patent
Zamir et al.

(10) Patent No.: US 8,577,868 B1
(45) Date of Patent: Nov. 5, 2013

(54) BOOKMARKS

(75) Inventors: Oren Zamir, Los Altos, CA (US); Jeffrey Korn, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/538,811

(22) Filed: Jun. 29, 2012

Related U.S. Application Data

(63) Continuation of application No. 11/669,626, filed on Jan. 31, 2007, now Pat. No. 8,239,367, which is a continuation-in-part of application No. 11/327,644, filed on Jan. 9, 2006.

(51) Int. Cl.
*G06F 7/00* (2006.01)
*G06F 17/30* (2006.01)

(52) U.S. Cl.
USPC .......................................................... 707/710

(58) Field of Classification Search
USPC .......................................................... 707/710
See application file for complete search history.

(56) References Cited

U.S. PATENT DOCUMENTS

| | | | | |
|---|---|---|---|---|
| 6,100,890 A * | 8/2000 | Bates et al. | .................... | 715/826 |
| 6,212,522 B1 | 4/2001 | Himmel et al. | | |
| 6,408,316 B1 * | 6/2002 | Himmel et al. | .............. | 715/206 |
| 6,493,702 B1 * | 12/2002 | Adar et al. | .................... | 707/706 |
| 6,631,496 B1 * | 10/2003 | Li et al. | .......................... | 715/200 |
| 6,636,848 B1 * | 10/2003 | Aridor et al. | .................. | 707/728 |
| 6,748,395 B1 * | 6/2004 | Picker et al. | .......................... | 1/1 |
| 6,810,395 B1 * | 10/2004 | Bharat | .................................. | 1/1 |
| 6,847,961 B2 * | 1/2005 | Lapstun et al. | .............. | 235/435 |
| 7,000,195 B2 * | 2/2006 | Komuro | ......................... | 715/805 |
| 7,031,961 B2 * | 4/2006 | Pitkow et al. | .......................... | 1/1 |
| 2002/0016786 A1 * | 2/2002 | Pitkow et al. | ..................... | 707/3 |
| 2002/0033847 A1 * | 3/2002 | Masthoff | ....................... | 345/776 |
| 2002/0078089 A1 * | 6/2002 | Bade et al. | ..................... | 707/513 |
| 2002/0184095 A1 * | 12/2002 | Scullard et al. | .................. | 705/14 |
| 2003/0046281 A1 * | 3/2003 | Son | .................................... | 707/6 |
| 2003/0046290 A1 * | 3/2003 | Yamada | .......................... | 707/10 |
| 2003/0126560 A1 * | 7/2003 | Kurapati et al. | .............. | 715/514 |
| 2004/0021685 A1 * | 2/2004 | Denoue et al. | ................. | 345/721 |
| 2005/0131866 A1 * | 6/2005 | Badros et al. | ...................... | 707/3 |
| 2005/0131897 A1 * | 6/2005 | Grasso et al. | ...................... | 707/6 |
| 2005/0192957 A1 * | 9/2005 | Newbold | ............................ | 707/5 |
| 2005/0256866 A1 * | 11/2005 | Lu et al. | ............................ | 707/5 |
| 2006/0015498 A1 * | 1/2006 | Sarmiento et al. | ................. | 707/6 |
| 2007/0043742 A1 * | 2/2007 | Arguello et al. | .............. | 707/100 |
| 2007/0043745 A1 * | 2/2007 | Rojer | ............................. | 707/100 |
| 2007/0094363 A1 | 4/2007 | Yruski et al. | | |
| 2007/0244868 A1 * | 10/2007 | Grubb et al. | ....................... | 707/3 |
| 2008/0040313 A1 * | 2/2008 | Schachter | ......................... | 707/2 |
| 2010/0169756 A1 * | 7/2010 | Bonchi et al. | ................. | 715/206 |

OTHER PUBLICATIONS

Co-pending U.S. Appl. No. 11/669,626, filed Jan. 31, 2007, entitled "BOOKMARKS," by Oren Zamir et al., 54 pages.
Wikipedia, "Delicious (Website)", http://en.wikipedia.org/wiki/delicious_(website), Feb. 2, 2012, 4 pages.
Dave Taylor et al., "Interview with Experts: What's so cool about del.icio.us?," Nov. 28, 2005, 13 pages.

\* cited by examiner

*Primary Examiner* — Robert Beausoliel, Jr.
*Assistant Examiner* — Nicholas Allen
(74) *Attorney, Agent, or Firm* — Harrity & Harrity, LLP

(57) ABSTRACT

A system receives a search query from a user and searches a repository of documents based on the search query to obtain search results. The system provides the search results to the user and automatically bookmarks one or more of the search results without the user explicitly requesting that the one or more search results be bookmarked.

20 Claims, 22 Drawing Sheets

FIG. 11

BOOKMARK RECORDS 240

| USER ID 1110 | BOOKMARK NAME 1130 | BOOKMARK ADDRESS 1140 | LABELS 1150 | SHARED FROM 1160 |
|---|---|---|---|---|
| | bookmark_name_1 | bookmark_URL_1 | label_1 | |
| | bookmark_name_2 | bookmark_URL_2 | label_2 | user_1 |
| | bookmark_name_3 | bookmark_URL_3 | label_3 | |
| | --- | --- | --- | |
| | bookmark_name_N | bookmark_URL_N | label_N | user_2 |

RECORD ENTRY 1120

BOOKMARKS

CROSS REFERENCE TO RELATED APPLICATION

This application is a continuation of U.S. patent application Ser. No. 11/669,626, entitled "Bookmarks" and filed Jan. 31, 2007, which is a continuation-in-part of U.S. patent application Ser. No. 11/327,644, entitled "Server Bookmarks" and filed Jan. 9, 2006, the disclosures of which are incorporated by reference herein in their entirety.

BACKGROUND

"Bookmarks" or "favorites" are typical ways for a browser executed at a client to remember documents (e.g., web pages) that a user has visited when browsing documents located on a network, such as, for example, the Internet. Bookmarks or favorites permit the user to return to the bookmarked document easily. Existing browser bookmarks (e.g., Internet Explorer's "Favorites") are stored under the current user's settings on a client computer. Local storage of a user's bookmarks at a client, however, has the disadvantage that the user cannot access the bookmarks across multiple different computers. When a user has, for example, a computer at work and at home, the user's bookmarks on one computer cannot be accessed from the other computer. Thus, using existing client-side bookmarks, users typically cannot access the same set of bookmarks across multiple different computers.

SUMMARY

According to one aspect, a method may include receiving a search query from a user and searching a corpus of documents based on the search query to obtain search results. The method may further include providing the search results to the user and automatically bookmarking one or more of the search results.

According to another aspect, a method may include maintaining a set of bookmarks associated with a user and receiving a search query from the user. The method may also include searching a corpus of documents based on the search query to produce first search results and searching the set of bookmarks associated with the user based on the search query to produce second search results. The method may further include providing the first search results and the second search results to the user.

According to a further aspect, a method may include maintaining a set of bookmarks associated with a first user and receiving selection of one or more bookmarks from the set of bookmarks by the first user. The method may also include receiving an identifier, from the first user, associated with a second user with whom the first user desires to share the selected one or more bookmarks and sharing the selected one or more bookmarks with the second user.

According to another aspect, a method may include maintaining a set of bookmarks associated with a user and obtaining a document accessed by the user. The method may further include retrieving information associated with a bookmark from the set of bookmarks that corresponds to the document accessed by the user and displaying the retrieved information via a toolbar in a browser.

According to a further aspect, a method may include maintaining a set of bookmarks associated with a user and receiving selections of one or more bookmarks from the set of bookmarks that the user desires to publish. The method may further include publishing the selected one or more bookmarks via one or more data feeds.

According to an additional aspect, a method may include recording a navigation history associated with a user accessing documents and automatically bookmarking selected ones of the accessed documents, without the user explicitly requesting that the selected ones of the accessed documents be bookmarked, based on the navigation history. The method may further include associating the bookmarked documents with the user.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

FIG. 11 is a diagram of exemplary bookmark records associated with a server of FIG. 2;

DETAILED DESCRIPTION

The following detailed description refers to the accompanying drawings. The same reference numbers in different drawings may identify the same or similar elements. Also, the following detailed description does not limit the invention.

Consistent with exemplary implementations, bookmarks may be moved from a client-side to a server-side to enable users to access the same set of bookmarks across different computers. Storage of bookmarks at a server permits users to use different computers at different locations while also being able to access the users' bookmarks from a remote centralized storage associated with the server. When implemented as part of a browser toolbar (e.g., Google toolbar), users may access the users' bookmarks from any computer and at any location and retrieve, manage, and add new bookmarks to a list of bookmarks maintained by the server for each of the users. The toolbar, according to one exemplary implementation, may permit a user to select the criteria used for automatically bookmarking (i.e., without explicit user selection of a bookmark) documents returned as a result of a document search. The toolbar, according to another exemplary implementation, may permit the user to select whether or not the user's bookmarks may also be searched when the user searches a corpus of documents (e.g., Google Web Search). The toolbar, according to a further exemplary implementation, may permit the user to share selected ones of the user's bookmarks with selected other users. The toolbar, according to yet another exemplary implementation, may permit the user to display bookmarks shared with that user by other users.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
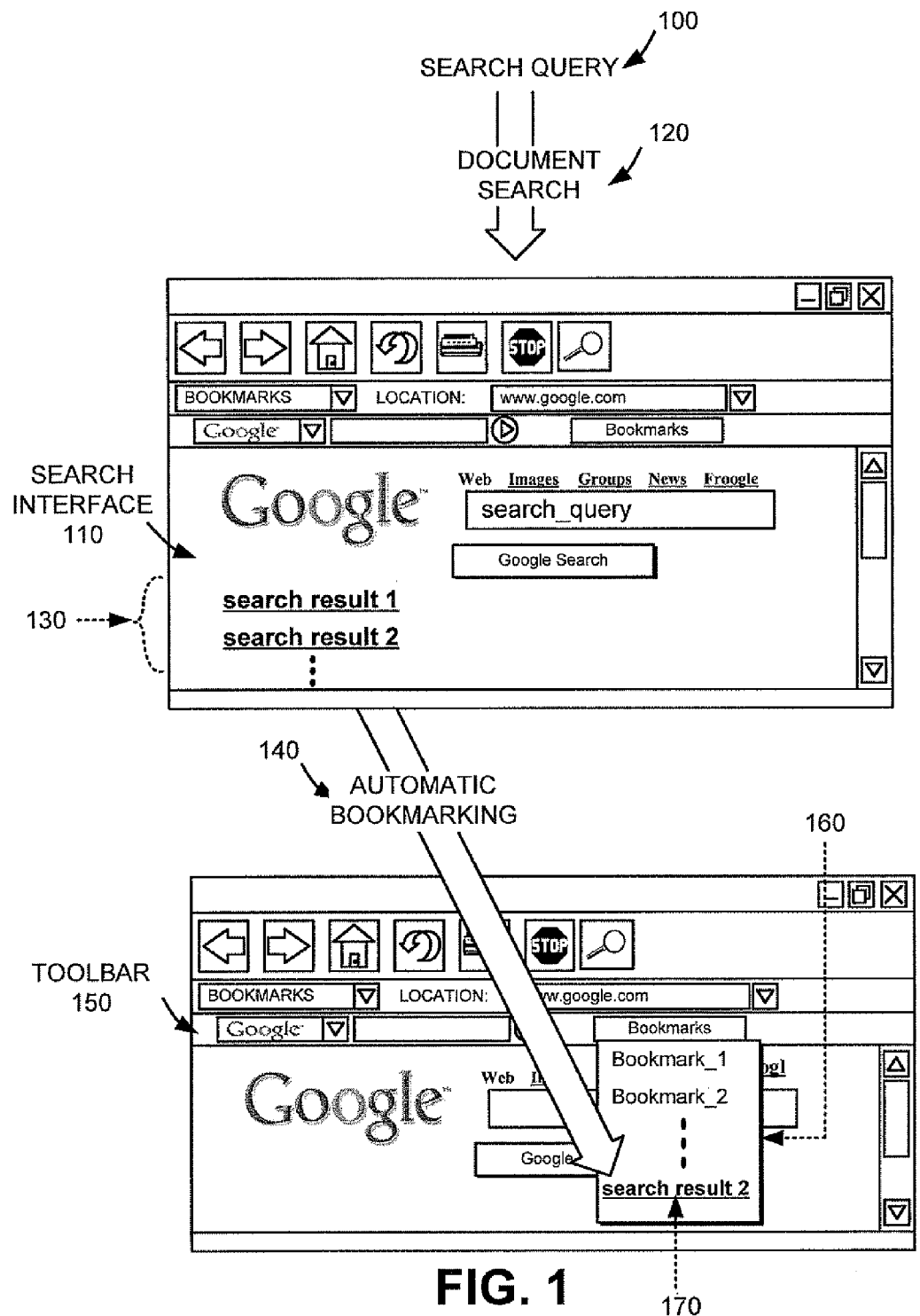
FIG. 1 is an exemplary diagram of an overview of an implementation described herein.

FIG. 1 illustrates an exemplary overview of one implementation that automatically bookmarks documents, such as, for example, documents returned as a result of a search of a corpus of documents. As shown in FIG. 1, a user at a client (not shown) may provide a search query 100 to a search engine (not shown) via a search interface 110. The search engine may search 120 a corpus of documents (e.g., a repository of crawled documents) to obtain a set of search results 130 which may be provided to the user via, for example, search interface 110. Each one of search results 130 may include, for example, a uniform resource locator (URL) associated with a document that has been determined by the search engine to match search query 100.

One or more documents included in search results 130 may then be automatically "bookmarked" 140 and stored with the user's "favorite places" or "bookmarks." As shown in FIG. 1, an automatically bookmarked search result (e.g., search result 2) may be included in a list 160 of the user's bookmarks that the user may access via toolbar 150 of a browser. The one or more documents included in search results 130 may be automatically bookmarked based on a number of criteria. For example, the one or more documents included in search results 130 may be automatically bookmarked if those documents have been previously selected a specified number of times from search results supplied to the user. As another example, documents that have been recommended (e.g., by other users), or documents that may be recommended by server 130 based on the user's past search history, may be automatically bookmarked from a set of search results. As a further example, search results that have been highly ranked by a search engine performing a document search may be automatically bookmarked. As an additional example, documents that have content relating to one or more user preferred topics may be automatically bookmarked.

Each automatically bookmarked document bookmark may be sent by toolbar 105 to a remote server (not shown) for storage. The remote server may store each document bookmark as a bookmark record in a data structure that stores multiple bookmark records.

Exemplary Network Configuration

Figure 2:
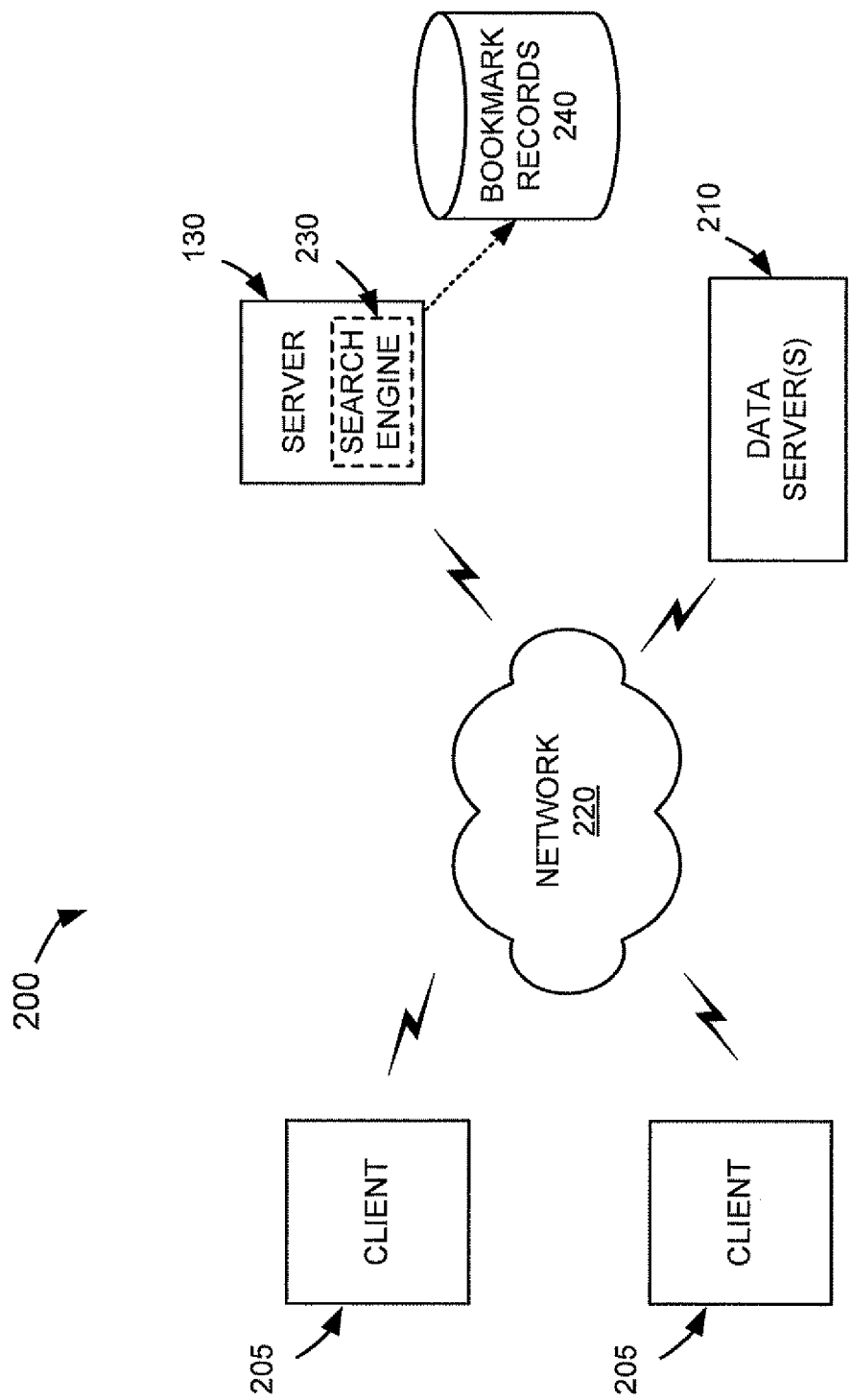
FIG. 2 is an exemplary diagram of a network in which systems and methods may be implemented.

FIG. 2 is an exemplary diagram of a network 200 according to exemplary implementations. Network 200 may include multiple clients 205 connected to one or more servers 130 or 210 via a network 220. Two clients 205 and two servers 130 and 210 have been illustrated as connected to network 220 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at servers 130 or 210. The browser may include a toolbar 105 that includes bookmark functionality, as further described in detail below. Servers 130 and 210 may include server entities that access, fetch, aggregate, process, search, and/or maintain documents in a manner consistent with aspects described herein. Clients 205 and servers 130 and 210 may connect to network 220 via wired, wireless, and/or optical connections.

In one implementation, server 130 may include a search engine 230 usable by users at clients 205. Server 130 may implement a data aggregation service by crawling a corpus of documents (e.g., web pages) hosted on data server(s) 210, indexing the documents, and storing information associated with these documents in a repository of crawled documents. The aggregation service may be implemented in other ways, such as by agreement with the operator(s) of data server(s) 210 to distribute their documents via the data aggregation service. Search engine 230 may execute a search using a query, received from a user at a client 205, on the corpus of documents stored in the repository of crawled documents. Server 130 may provide, to a user issuing a query, a ranked list of documents related to the issued query. Server 130 may also store bookmarks, received from respective users at clients 205, in bookmarks records 240. Bookmark records 240 may store bookmark information associated with users' bookmarks provided by respective toolbars 105 to server 130. The stored bookmarks may subsequently be retrieved by respective toolbars 105 associated with users at clients 205 via server 130.

Data server(s) 210 may store or maintain documents that may be crawled by server 130. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific products, such as product data provided by one or more product manufacturers. As yet another example, server(s) 210 may store or maintain data related to other types of web documents, such as pages of web sites.

While servers 130 and 210 are shown as separate entities, it may be possible for one of servers 130 or 210 to perform one or more of the functions of the other one of servers 130 or 210. For example, it may be possible that servers 130 and 210 are implemented as a single server. It may also be possible for a single one of servers 130 and 210 to be implemented as two or more separate (and possibly distributed) devices.

Network 220 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
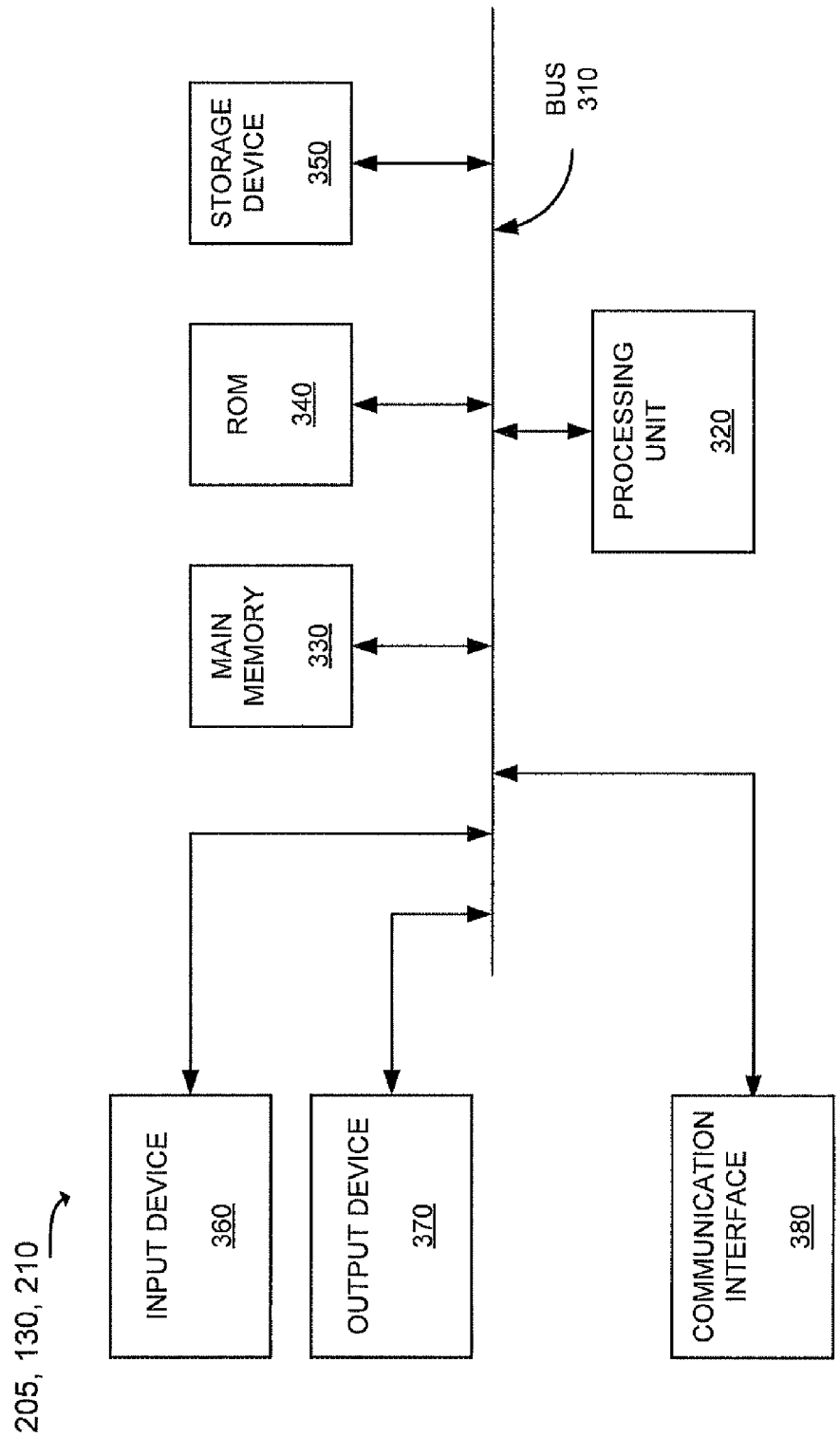
FIG. 3 is an exemplary diagram of a client or server of FIG. 2 according to an exemplary implementation.

FIG. 3 is an exemplary diagram of a client or server entity (hereinafter called "client/server entity"), which may correspond to one or more of clients 205 and/or servers 130 or 210, according to an exemplary implementation. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with exemplary implementations, may perform certain processes, as will be described in detail below. The client/server entity may perform these processes in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with exemplary implementations. Thus, implementations are not limited to any specific combination of hardware circuitry and software.

Exemplary Client Toolbar

Figure 4:
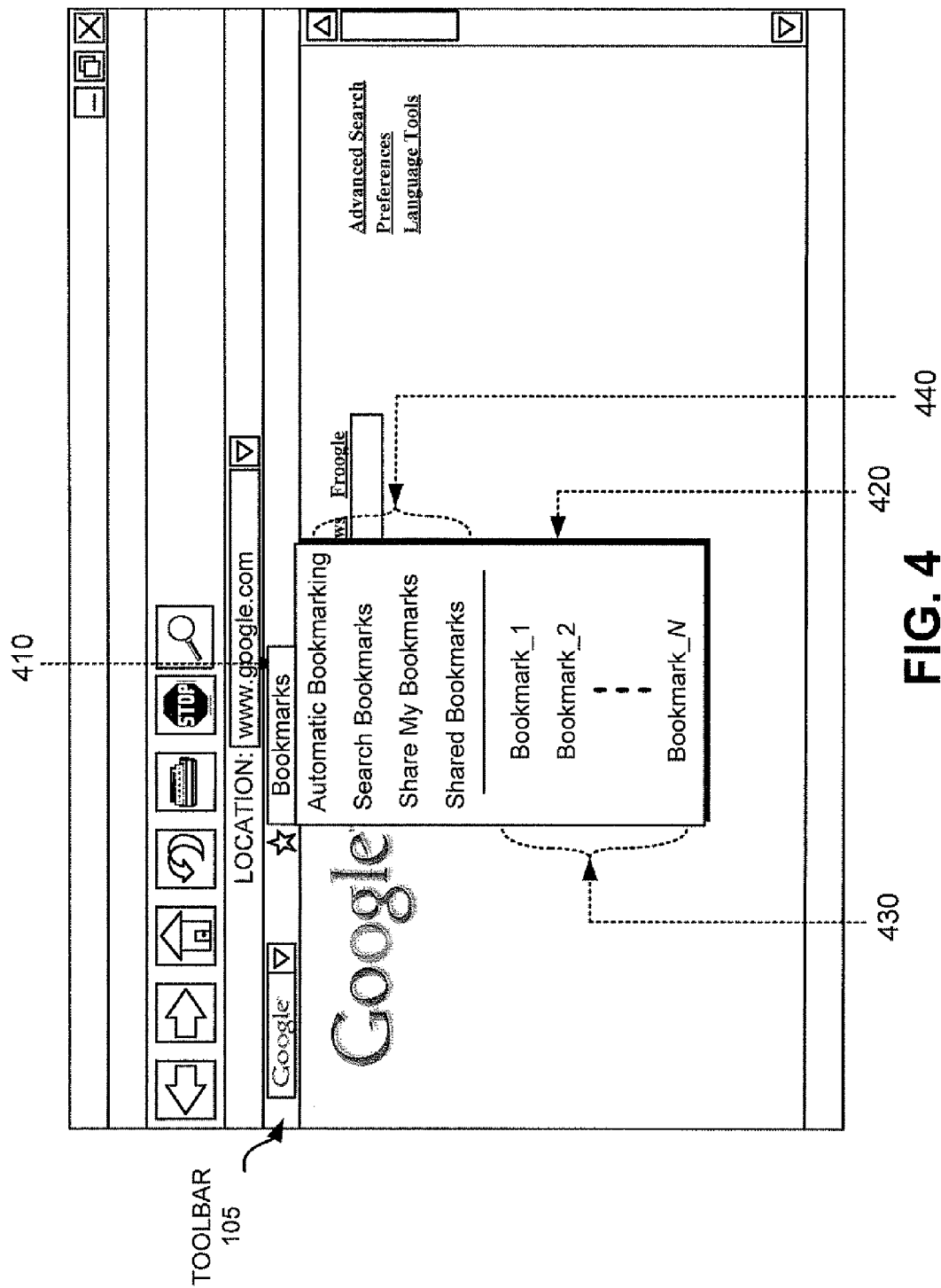
FIG. 4 is a diagram of an exemplary toolbar that includes bookmarks that may be stored at a remote server.

FIG. 4 is a diagram that depicts an exemplary browser toolbar 105 at a client 205. Among other features, toolbar 105 may include a "bookmark" button 410, the selection of which by a user at client 205 may produce a bookmark window 420. Bookmark window 420 may include a list of bookmarks 430 associated with the user, and bookmark actions 440 that may be selected by the user. As shown, bookmark actions 440 may include "automatic bookmarking," the selection of which enables documents to be automatically bookmarked based on a number of criteria. Bookmark actions 440 may further include "search bookmarks," the selection of which permits search engine 230 to search the user's bookmarks when performing a search of a corpus of documents. Bookmark actions 440 may also include "share my bookmarks," the selection of which permits the user to share selected ones of the user's bookmarks with selected other users. Bookmark actions 440 may additionally include "shared bookmarks," the selection of which enables the user to view bookmarks shared with the user from other users.

Figure 5:
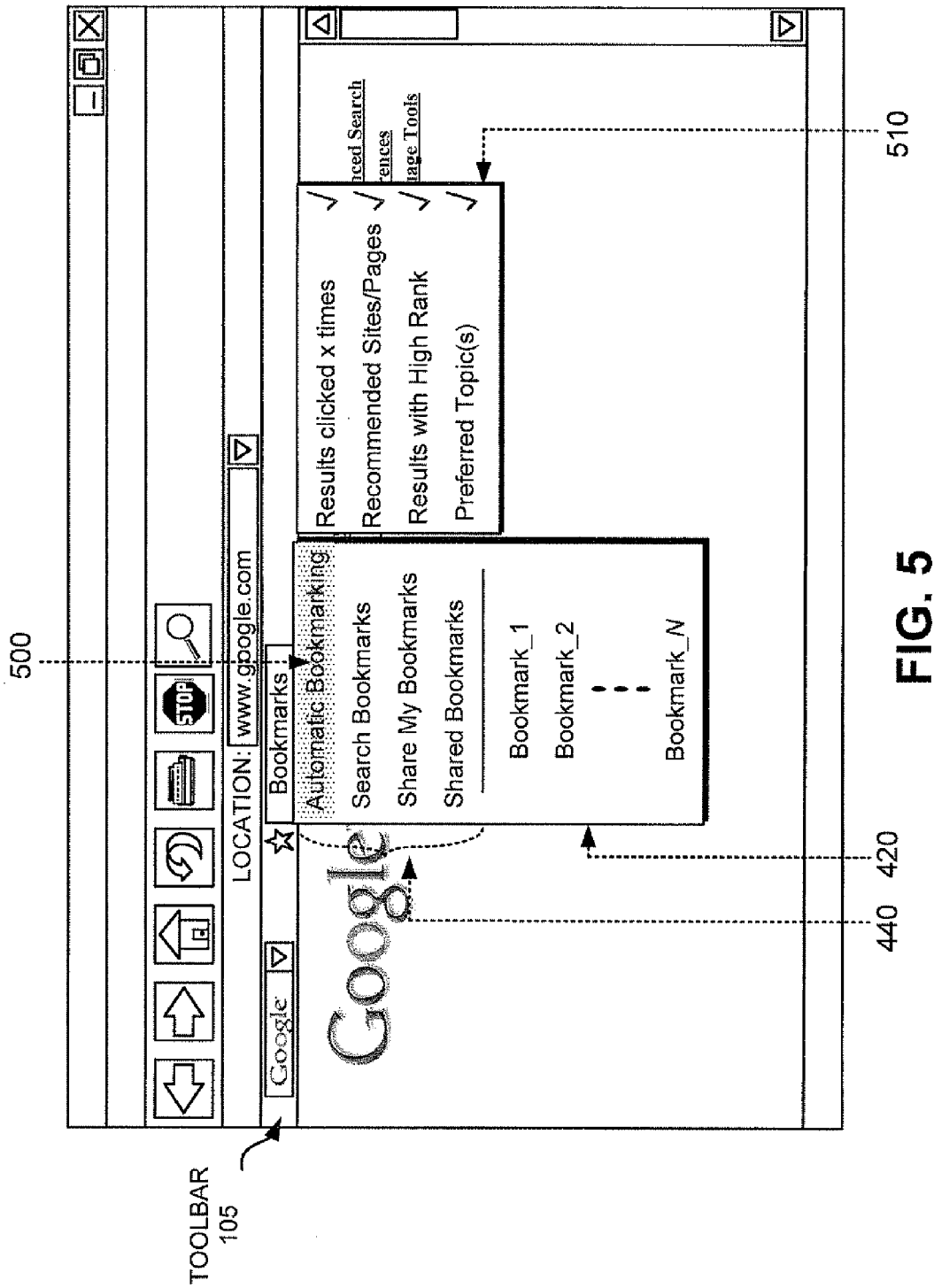
FIGS. 5-7 are diagrams that depict the selection of "automatic bookmarking" actions from a window of the toolbar of FIG. 4.

FIG. 5 is a diagram illustrating the selection of "automatic bookmarking" 500 from bookmark window 420 of toolbar 105. Selection of "automatic bookmarking" 500 (e.g., clicking on "automatic bookmarking" in window 420 using, for example, a mouse) may result in toolbar 105 displaying a window 510 that includes a number of criteria that a user may further select to identify when automatic bookmarking of documents should occur. For example, window 510 may include a "results clicked x times" criteria, a "recommended sites/pages" criteria, a "results with high rank" criteria, and a "preferred topic(s)" criteria. In another implementation, additional or different criteria may be presented. A user may select one or more of the criteria from window 510 to determine when documents may be automatically bookmarked.

If the user selects the "results clicked x times" criteria from window 510, a search result document may be automatically bookmarked if that document has been selected at least x times from search results previously supplied to the user. For example, document_p may have been selected from search results x times (e.g., two times) in the past or within some window of time (e.g., in the last thirty days).

If the user selects "recommended sites/pages" from window 510, then documents that have been recommended (e.g., by other users), or documents that may be recommended by server 130 based on the user's past search history, may be automatically bookmarked. If the user selects "results with high rank," then search results that have been highly ranked by search engine 230 may be automatically bookmarked. When returning a set of search results to the user, search engine 230 may score, using any existing scoring algorithm, each of the search results with respect to one another based on, for example, each search result's relevance to the user's search query, or based on other factors (e.g., link-based factors). The scores may subsequently be used to rank the search results among one another (i.e., order the search results from highest scoring search result to lowest scoring search result). The scores may also be used to determine whether a given search result may be automatically bookmarked. For example, if a ranking score associated with a search result is greater than a threshold value, then the search result may be automatically bookmarked. The user may, for example, select this threshold value. In another implementation, the highest scored search result among a set of search results may be automatically bookmarked.

If the user selects "preferred topics" from window 510, then documents that have content relating to one or more user preferred topics may be automatically bookmarked. For example, the user may have a preference for documents related to "football" and "NASCAR racing." When "preferred topics" from window 510 is selected by the user, then any search results that are provided to the user as a result of a subsequent search that have content relating to "football" or "NASCAR racing" may be automatically bookmarked. A user's preferred topics may be explicitly provided by the user, or may be inferred from the user's current bookmarks, from the user's past searching history, or based on how often the user accesses documents related to a certain topic.

Figure 6:
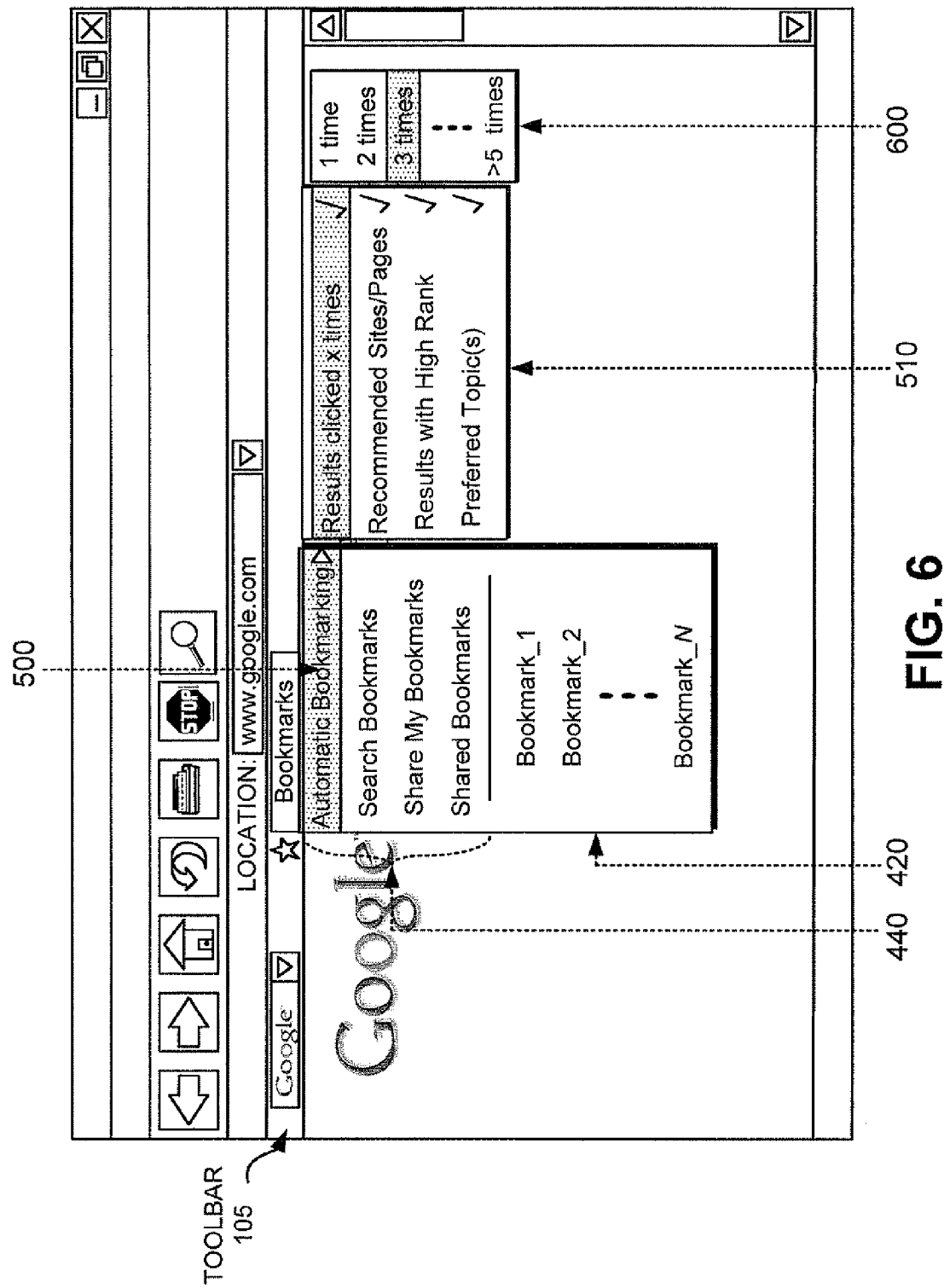

FIG. 6 illustrates the selection of the criteria "results clicked x times" from window 510 of toolbar 105. After "automatic bookmarking" 500 is selected from bookmark actions 440 and "results clicked x times" is selected from window 510, toolbar 105 may display a window 600 that may list a number of times that a search result should have been previously selected before that search result may be automatically bookmarked (e.g., "1 time," "2 times," "3 times," ">x times"). The user may select from the list displayed in window 600 the number of times that a given search result should have been previously selected before that search result may be automatically bookmarked.

Figure 7:
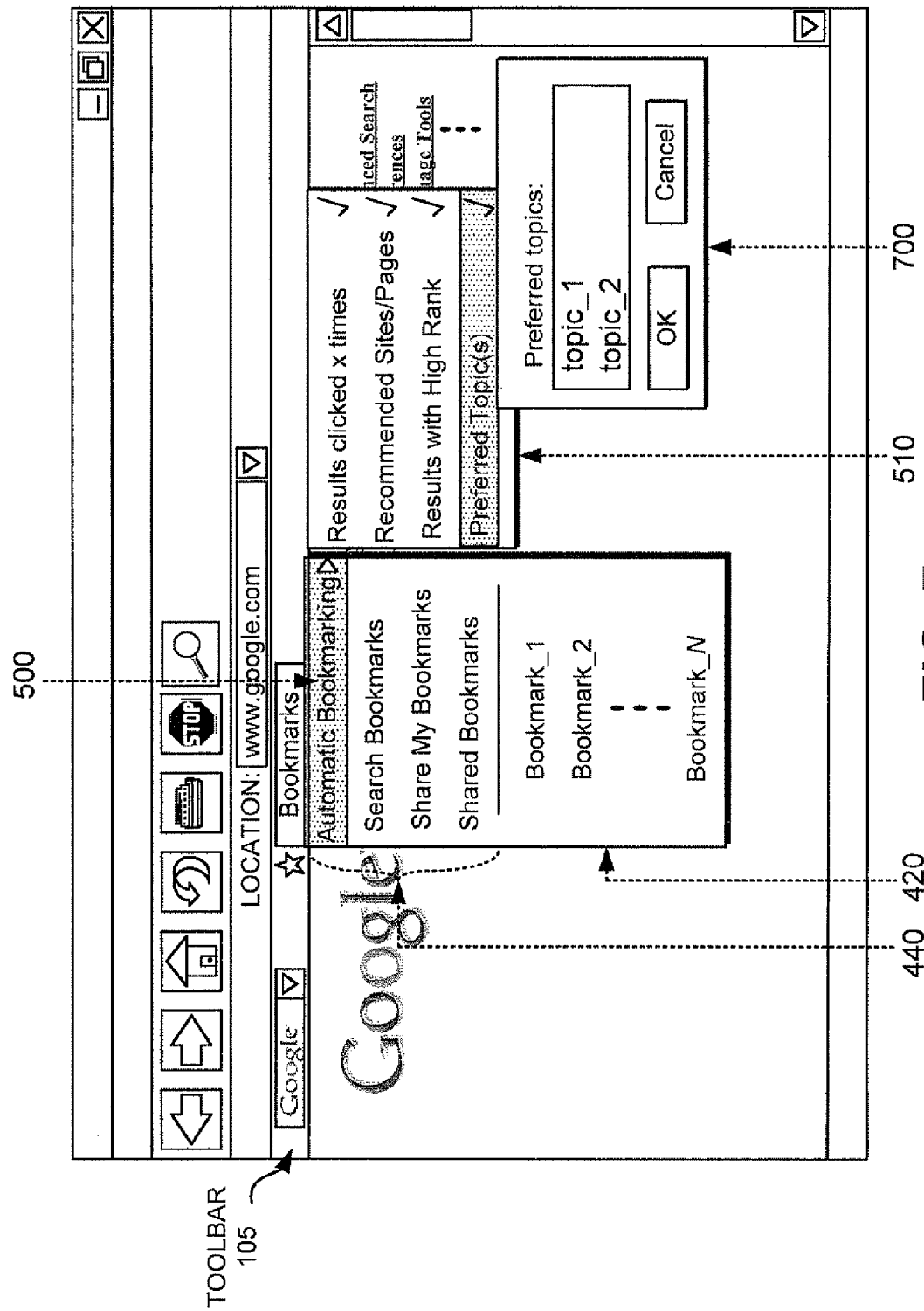

FIG. 7 illustrates the selection of the criteria "preferred topics" from window 510 of toolbar 105. After "automatic bookmarking" 500 is selected from bookmark actions 440 and "preferred topics" is selected from window 510, toolbar 105 may display a window 700 that permits user entry of preferred topics. For example, the user may enter topics "topic_1" and "topic_2" in window 700. Any results of subsequent searches that have content related to topics "topic_1" and "topic_2" may be automatically bookmarked.

Figure 8:
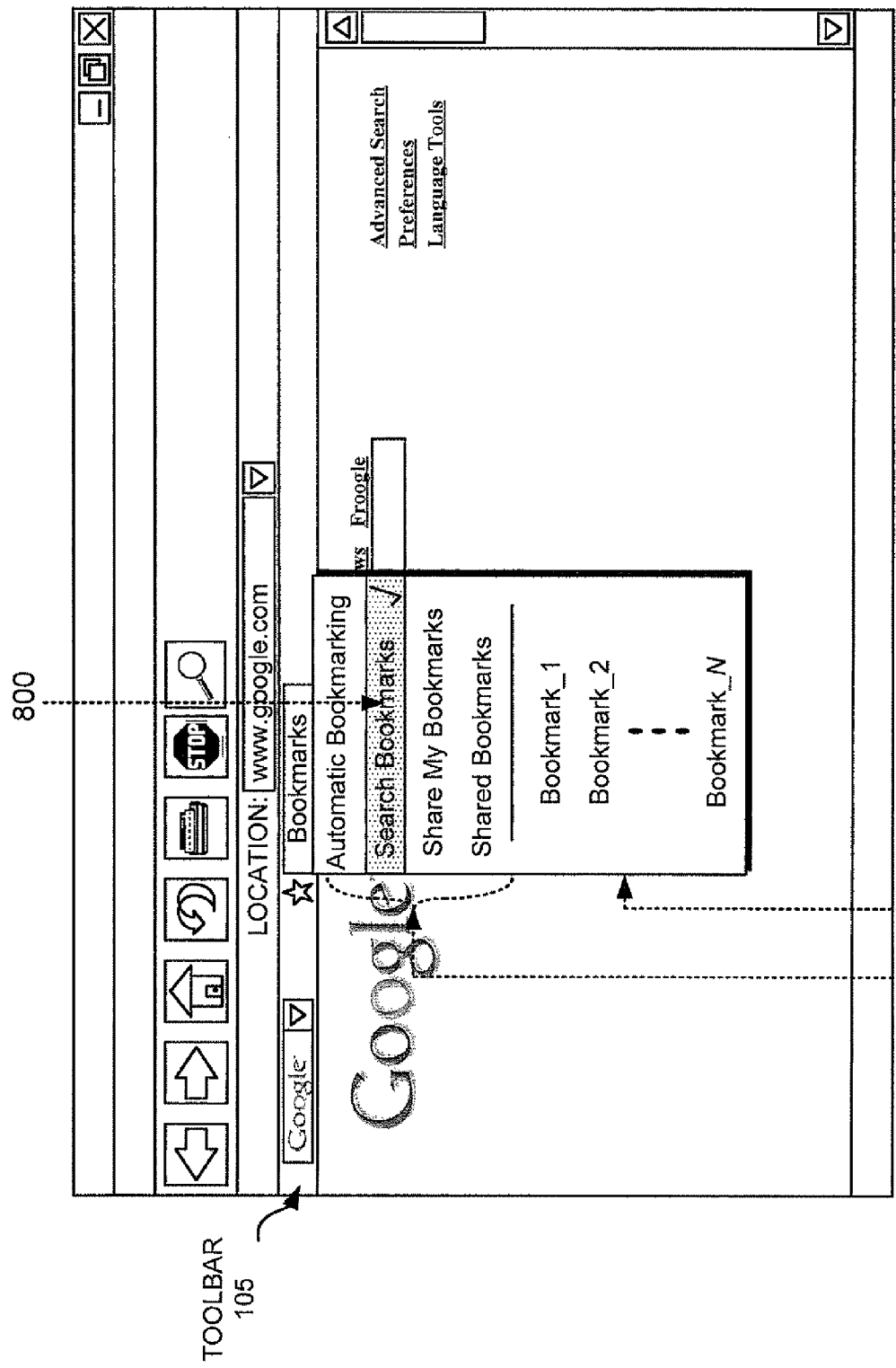
FIG. 8 is a diagram that depicts the selection of a "search bookmarks" action from a window of the toolbar of FIG. 4.

FIG. 8 is a diagram illustrating the selection of "search bookmarks" 800 from bookmark window 420 of toolbar 105. Selection of "search bookmarks" 800 (e.g., clicking on "search bookmarks" in window 420 using, for example, a mouse) may result in, for example, a visual identifier being displayed in window 420 (e.g., an icon or check mark) indicating that the user's bookmarks will also be searched in subsequent searches. When a user has selected "search bookmarks" 800, search engine 230 may subsequently, when searching a corpus of documents based on a search query supplied by the user, also search that user's bookmarks. The search results returned to the user by search engine 230 may include the user's bookmarks that also match the user's search query.

Figure 9:
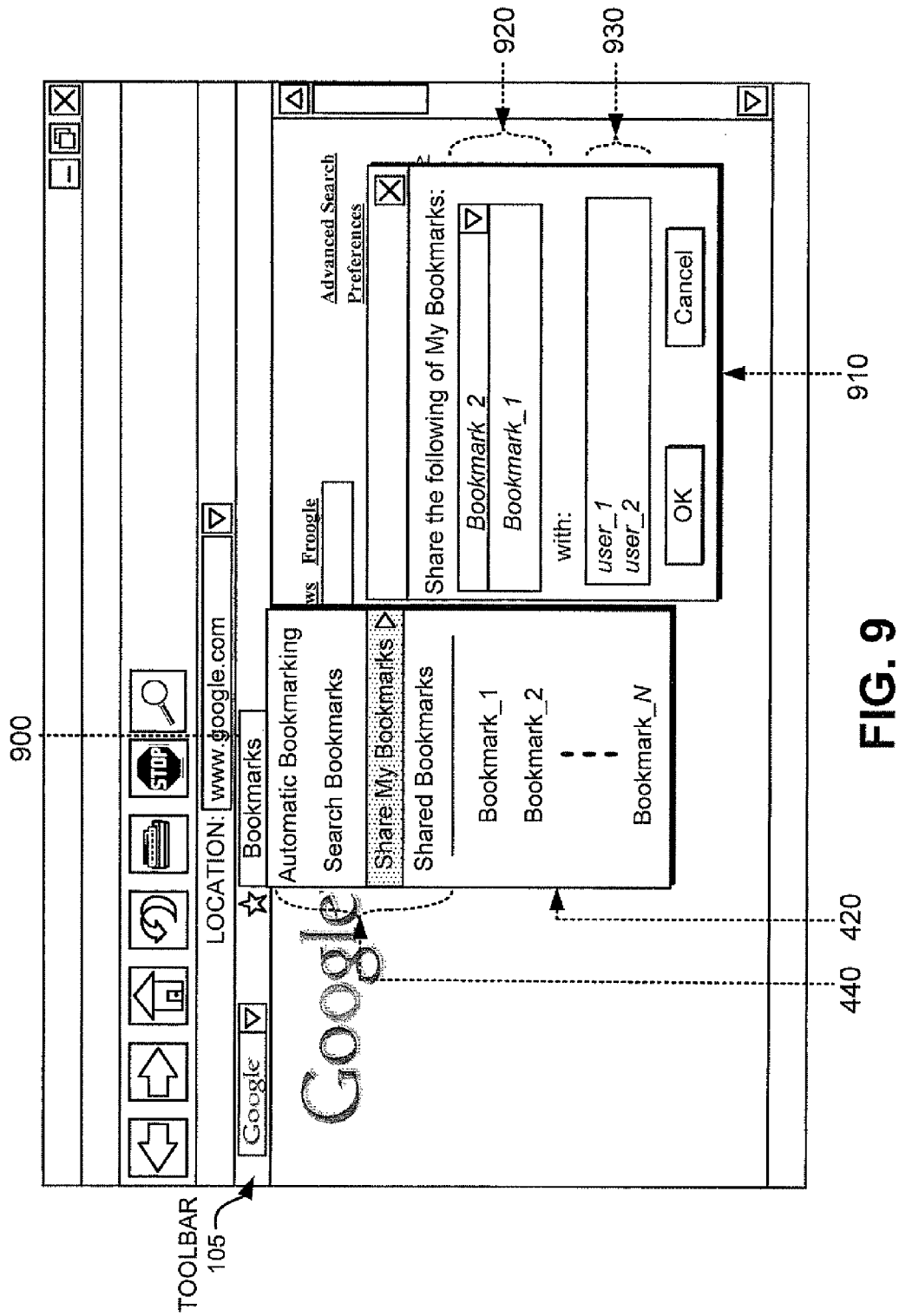
FIG. 9 is a diagram that depicts the selection of a "share my bookmarks" action from a window of the toolbar of FIG. 4.

FIG. 9 is a diagram illustrating the selection of "share my bookmarks" 900 from bookmark window 420 of toolbar 105. Selection of "share my bookmarks" 900 (e.g., clicking on "share my bookmarks" in window 420 using, for example, a mouse) may result in toolbar 105 displaying a window 910 that permits the user to specifically indicate which bookmarks that the user wants to share. Window 910 further permits the user to indicate which other users with whom the user desires to share the selected bookmarks. For example, as shown in FIG. 9, window 910 may include a bookmark identifying section 920 that permits the user to select (e.g., from a drop-down menu) the specific bookmarks that the user desires to share. As further shown in FIG. 9, window 910 may also include a user identifying section 930 that permits the user to select (e.g., from a drop-down menu) the other users with whom the user desires to share his/her bookmarks. The other users that may be selected in user identifying section 930 may include other users previously selected by the user, other users associated with a same group as the user, other users from an address book, or other users associated with previous email contacts.

Figure 10:
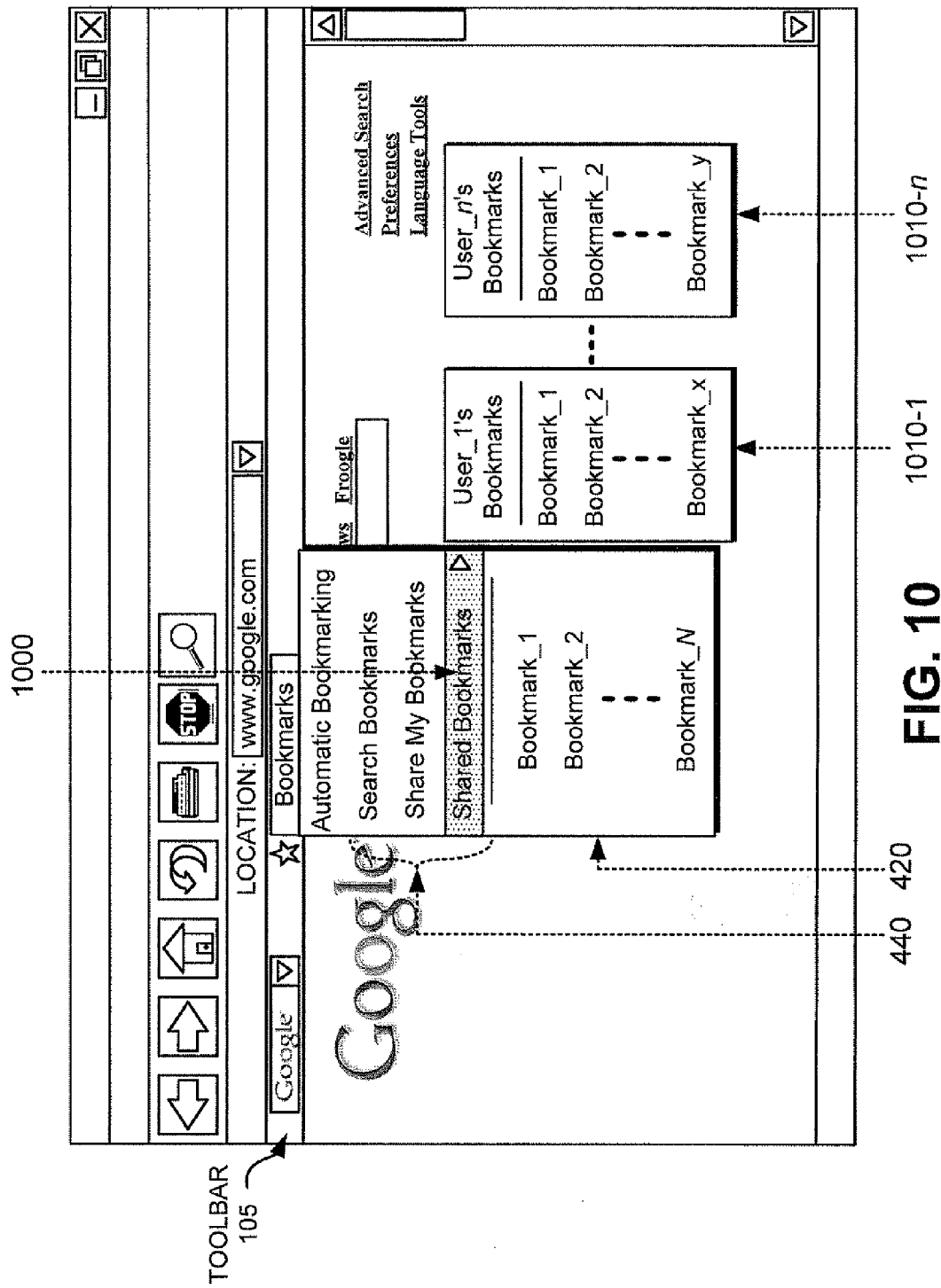
FIG. 10 is a diagram that depicts the selection of, and display of, "shared bookmarks" from a window of the toolbar of FIG. 4.

FIG. 10 is a diagram illustrating the selection of "shared bookmarks" 1000 from bookmark window 420 of toolbar 105. Selection of "shared bookmarks" 1000 (e.g., clicking on "shared bookmarks" 1000 in window 420 using, for example, a mouse) may result in toolbar 105 displaying one or more additional windows 1010-1 through 1010-*n* that list the bookmarks shared with the selecting user by other users (e.g., shared by the other users in a fashion similar to that described above with respect to FIG. 9). For example, as shown in FIG. 10, a first user (user_1) may have shared several bookmarks (bookmark_1 through bookmark_x) and an nth user may have shared several bookmarks (bookmark_1 through bookmark_y). The user with whom user_1 and user_n have shared selected bookmarks with may view and access those bookmarks via respective windows 1010-1 through 1010-*n* of toolbar 105.

Exemplary Bookmark Records

FIG. 11 illustrates exemplary bookmark records 240 according to an exemplary implementation. Bookmark records 240 may include bookmarks received from one or more users, with each user being identified by a different, unique user identifier (ID) 1110. User ID 1110 may include, for example, an Internet Protocol (IP) address associated with a user, a user log-in identifier, or any other type of unique data for identifying the user. As shown in FIG. 11, each user ID 1110 may have one or more record entries 1120 associated with it. Each record entry 1120 may include a bookmark name 1130, a bookmark address 1140, one or more labels 1150 and, possibly, an identifier 1160 that identifies another user that may have shared the bookmark with the user identified by user ID 1110.

Bookmark name 1130 may include any name designated by the user for the particular bookmark. For example, if a user bookmarks the document www.google.com, the user may name the bookmark "Google." Bookmark address 1140 may include an address (e.g., a URL) of the document bookmarked by the user. Labels 1150 may include one or more different designated textual labels given by the user to the bookmark. Labels 1150, for example, may also include any type of user annotations associated with the bookmark. Identifier 1160 may include, for example, an Internet Protocol (IP) address associated with another user that shared the bookmark identified by bookmark name 1130, a log-in identifier of the other user, or any other type of unique data for identifying the other user that shared the bookmark.

Exemplary Automatic

Bookmarking Process

Figure 12:
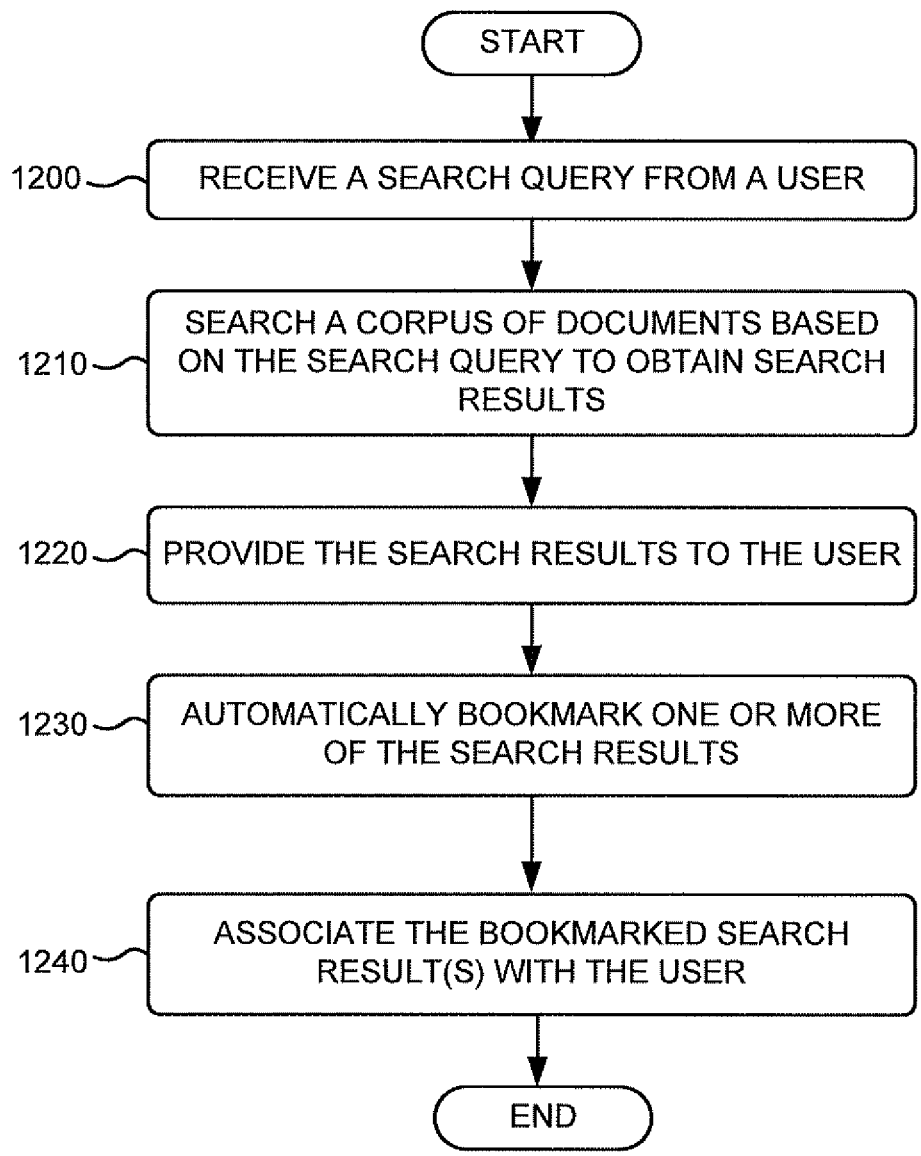
FIG. 12 is a flowchart of an exemplary process for automatically bookmarking search results.

FIG. 12 is a flowchart of an exemplary process for automatically bookmarking documents. The process exemplified by FIG. 12 may be performed by search engine 230 and/or toolbar 105.

Figure 13:
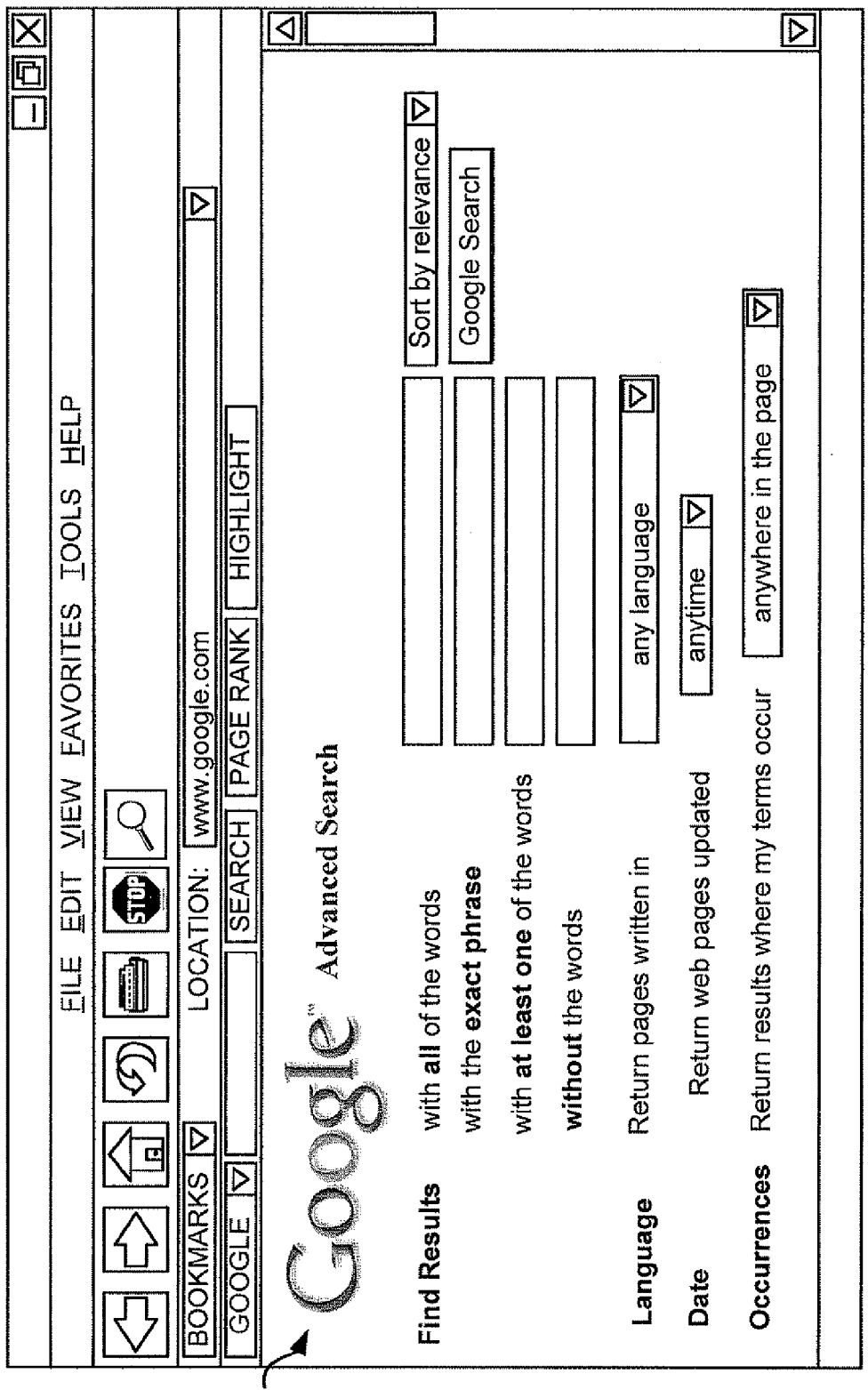
FIG. 13 is a diagram of an exemplary document for user entry of a search query.

The exemplary process may begin with the receipt of a search query from a user (block 1200). As shown in FIG. 13, the user may enter a search query, that may include one or more words or phrases, into a search document 1300 provided to the user at a client 205. Server 130 may provide search document 1300 to a browser at the user's client 205 for presentation to the user. Upon entry of the search query into search document 1300, client 205 may send the search query to search engine 230 of server 130 via network 220.

A corpus of documents may be searched based on the received search query to obtain search results (block 1210). Search engine 230 may search, for example, a repository of crawled documents using the received search query and an existing document searching algorithm to identify documents that match the received search query. The obtained search results may be provided to the user (block 1220). The obtained search results may be provided to a browser executed in the user's client 205 via a search result document that, for example, lists the search results. In one implementation, the search result document may list addresses (e.g., URLs) associated with the search results. Prior to providing the search results to the user, search engine 230 may rank the search results among one another using any ranking technique. For example, search engine 230 may rank the search results in an order from most relevant to least relevant search result.

One or more of the search results may be automatically bookmarked (block 1230). The one or more search results may be automatically bookmarked based on a number of different user-selected criteria. As already described with respect to FIG. 5 above, the user may select "automatic bookmarking" 500 from bookmark window 420 of toolbar 105 which may result in toolbar 105 displaying a window 510 that includes a number of criteria that the user may further select to identify when automatic bookmarking of documents should occur. For example, window 510 may include a "results clicked x times" criteria, a "recommended sites/pages" criteria, a "results with high rank" criteria, and a "preferred topic(s)" criteria. If the user selects the "results clicked x times" criteria, search result documents may be automatically bookmarked if those documents have been selected at least x times (where x may be selected by the user) from search results previously supplied to the user. Additionally, if the user selects "recommended sites/pages" from window 510, then documents that have been recommended (e.g., by other users), or documents that may be recommended by server 130 based, for example, on the user's past search history, may be automatically bookmarked. Furthermore, if the user selects "results with high rank," then search results that have been highly ranked by search engine 230 (e.g., ranked higher than a threshold) may be automatically bookmarked. For example, the highest ranked search result of the search results may be automatically bookmarked. Also, if the user selects "preferred topics" from window 510, then documents that have content relating to one or more user preferred topics may be automatically bookmarked. One or more labels may also be automatically selected for each bookmarked search result. For example, the search result "espn.com" could be automatically labeled "sports" based on either data from other users, or query log data maintained by server 130.

Figure 14:
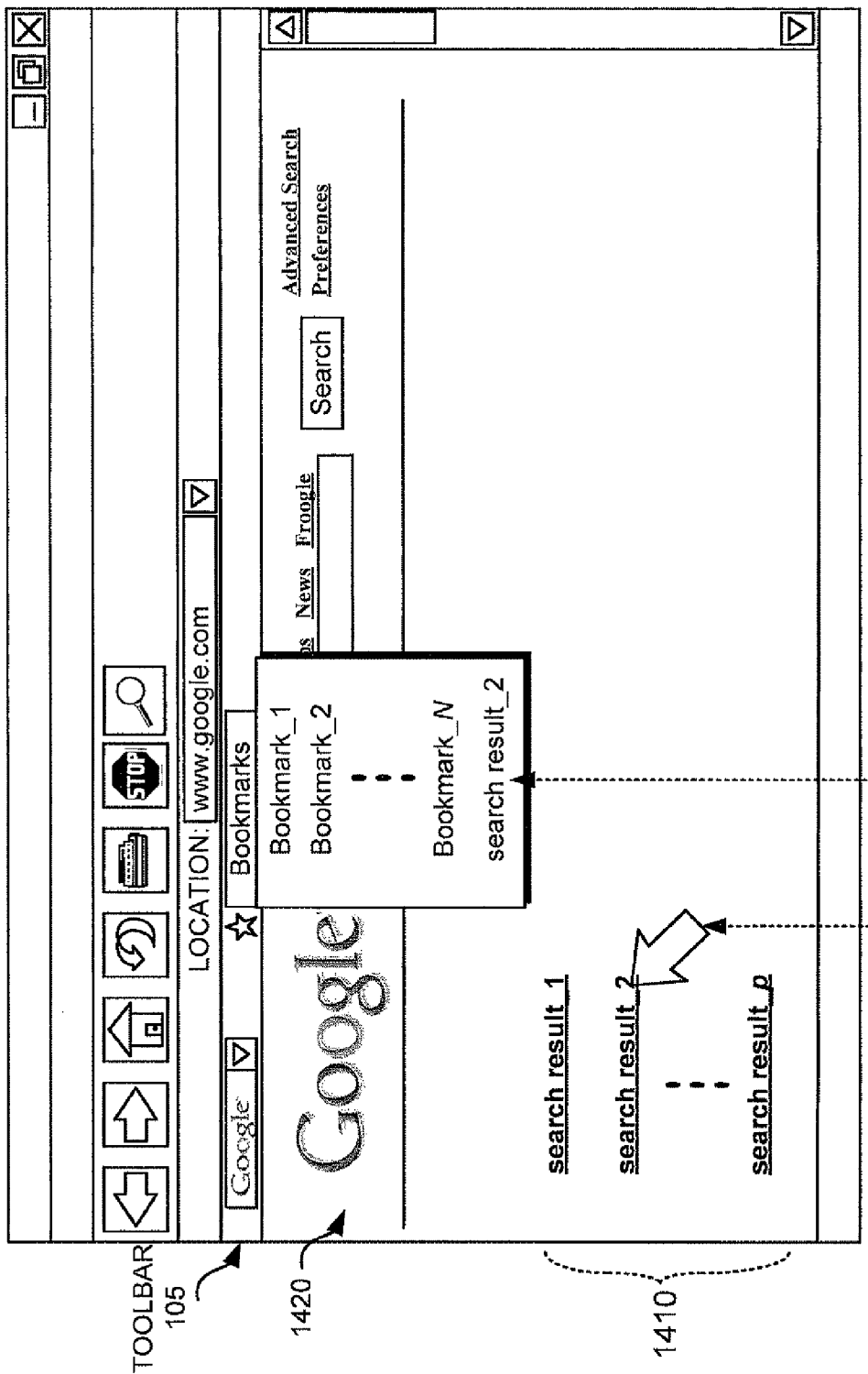
FIG. 14 is a diagram that depicts the selection of a search result from a set of search results and the automatic bookmarking of that search result based on the selection.

FIG. 14 illustrates one exemplary implementation in which a user selects a search result 1400 (search result_2), for the xth time, from a list of search results 1410 provided to a user in a search result document 1420. As further shown in FIG. 14, selection of search result 1400 results in search result 1400 being included as a bookmark 1430 in the user's bookmarks that may be provided to the user via toolbar 105. The bookmarked search results may be associated with the user (block 1240). Each bookmarked search result may be stored in a corresponding record entry 1120, associated with that user's user ID 1110, of bookmark records 240.

Exemplary Bookmark Searching Process

Figure 15:
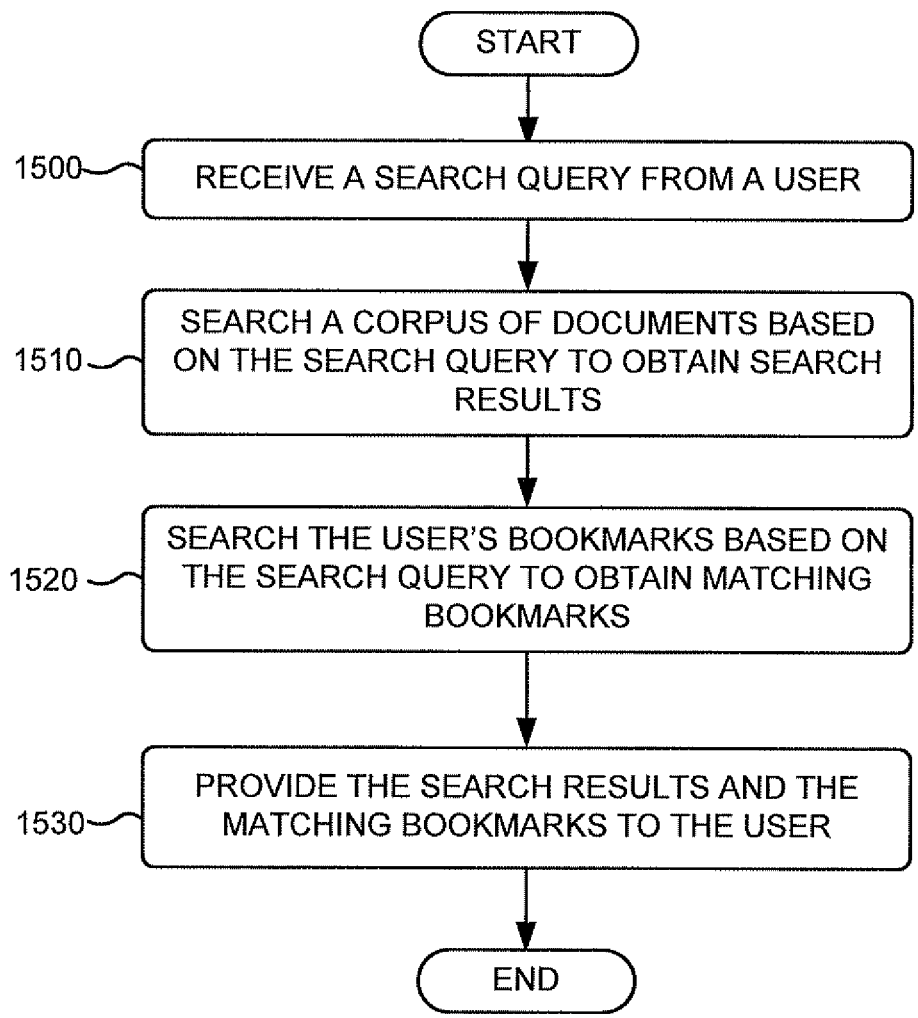
FIG. 15 is a flowchart of an exemplary process for searching a user's bookmarks when searching a corpus of documents.

FIG. 15 is a flowchart of an exemplary process for searching a user's bookmarked documents. The process exemplified by FIG. 15 may be performed by search engine 230 and/or toolbar 105.

The exemplary process may begin with the receipt of a search query from a user (block 1500). As already shown in FIG. 13, the user may enter a search query, that may include one or more words or phrases, into a search document 1300 provided to the user at a client 205. Server 130 may provide search document 1300 to a browser at the user's client 205 for presentation to the user. Upon entry of the search query into search document 1300, client 205 may send the search query to search engine 230 of server 130 via network 220.

A corpus of documents may be searched based on the search query to obtain search results (block 1510). Search engine 230 may search, for example, a repository of crawled documents using the received search query and a document searching algorithm to identify documents that match the received search query.

The user's bookmarks may also be searched based on the search query to obtain matching bookmarks (block 1520). A user identifier 1110 associated with the user may be used by search engine 230 to index bookmark records 240 to search bookmarks associated with that user identifier 1110. The search of the user's bookmarks may include searching record entries 1120 corresponding to the user identifier 1110 to identify bookmark names 1130, bookmark addresses 1140 and/or labels 1150 that match the user's search query. Alternatively, or additionally, content of the documents that correspond to the user's bookmarks may be searched.

Figure 16:
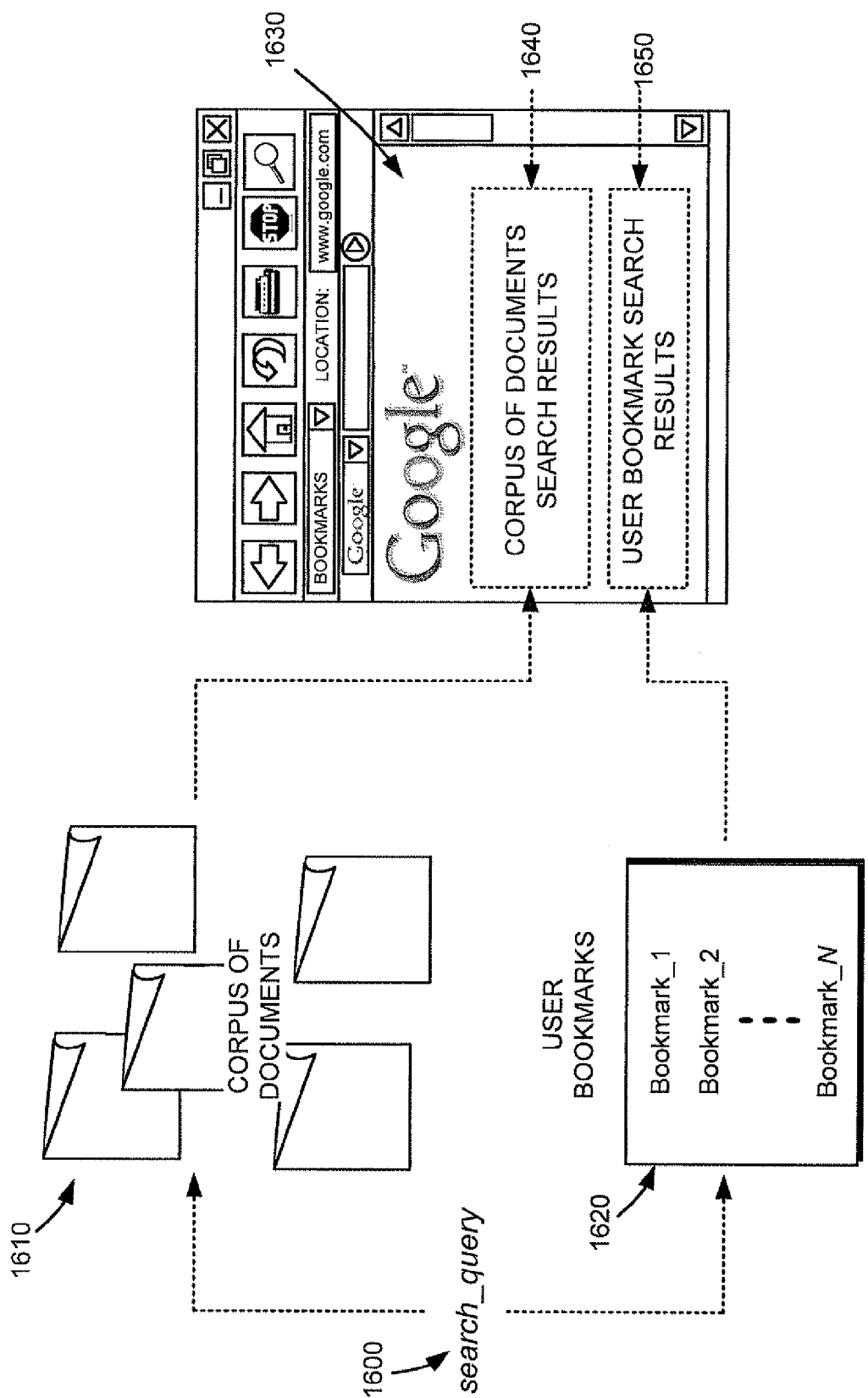
FIG. 16 is a diagram that graphically illustrates the exemplary process of FIG. 15.

The search results and the matching bookmarks may be provided to the user (block 1530). FIG. 16 graphically illustrates the exemplary bookmark searching process described above with respect to FIG. 15. As shown in FIG. 16, a search query 1600, issued by a user, may be used to search a corpus of documents 1610 and the user's bookmarks 1620. The results of the search of the corpus of documents 1610 and the user's bookmarks 1620 may be provided to the user via a search result document 1630 that includes search results 1640 resulting from a search of corpus of documents 1610 and search results 1650 resulting from a search of the user's bookmarks 1620. In one implementation, search results 1640 and 1650 may be indistinguishably mixed together in search result document 1630. In another implementation, search results 1650 may be visually distinguished (e.g., highlighted or segregated) from search results 1640.

Exemplary Bookmark Information Process

Figure 17:
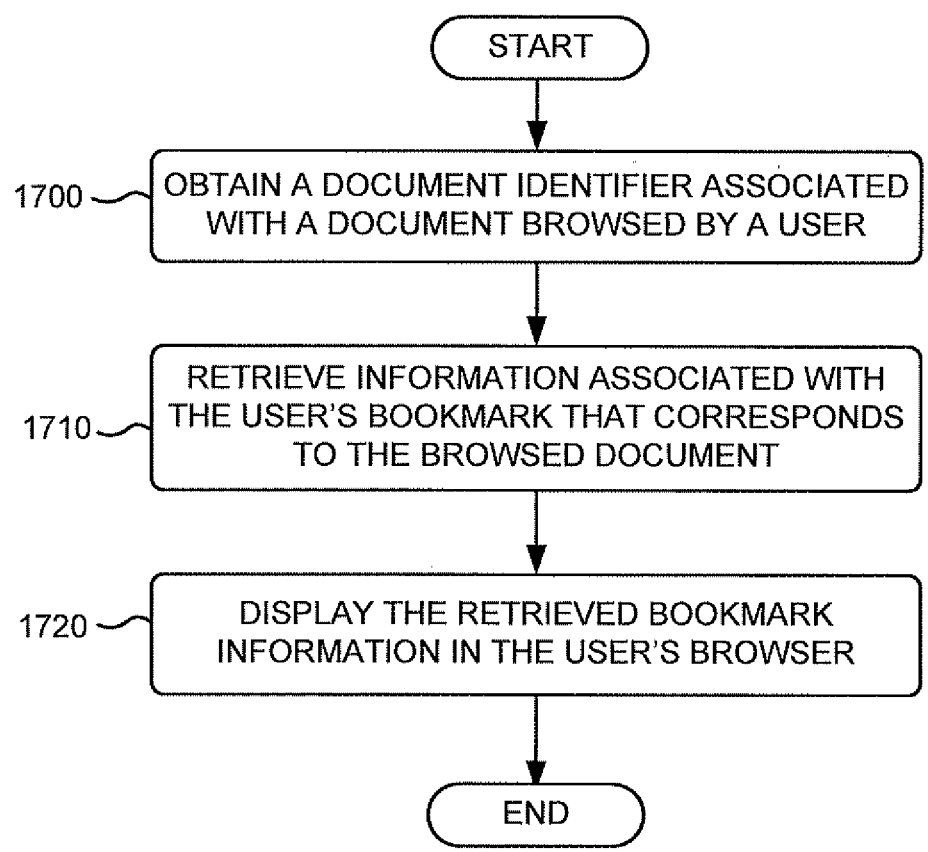
FIG. 17 is a flowchart of an exemplary process for obtaining and displaying bookmark information associated with a browsed document.

FIG. 17 is a flowchart of an exemplary process for obtaining and displaying bookmark information associated with a browsed document. The process exemplified by FIG. 17 may be performed by toolbar 105 of a browser and/or search engine 230.

Figure 18:
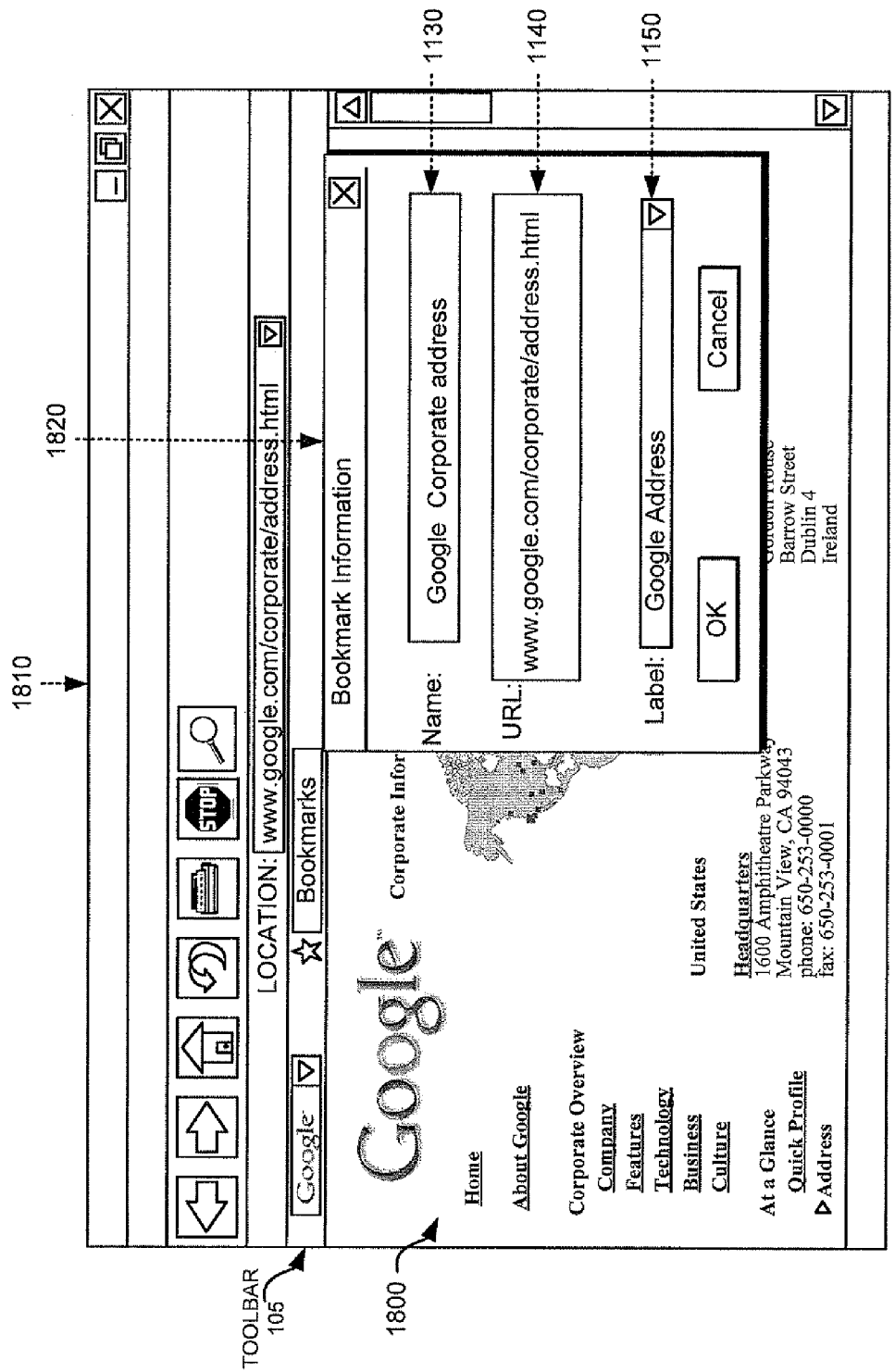
FIG. 18 is a diagram that depicts the display of bookmark information associated with a browsed document via a browser toolbar.

The exemplary process may begin with obtaining a document identifier associated with a document browsed by a user (block 1700). For example, as shown in FIG. 18, a user may browse a document 1800 using a browser 1820. Document 1800 may have a document identifier (e.g., a URL) associated with it that browser 1820 uses to load document 1800. Toolbar 105 may obtain the document identifier from browser 1820. As another example, a user may select a search result from a set of search results provided by search engine 230. When the user's browser loads the document that corresponds to the selected search result, toolbar 105 may obtain the document identifier from the browser.

Information associated with the user's bookmark that corresponds to the browsed document may be retrieved (block 1710). Toolbar 105 may request bookmark information from bookmark records 240 via server 130. For example, toolbar 105 may send the user identifier associated with the browsing user and the address (e.g., URL) associated with the browsed document to server 130. Server 130 may locate the record entry 1120 associated with the user ID 1110 in bookmark records 240 that corresponds to the user identifier received from toolbar 105 and that includes a bookmark address 1140 that matches the address received from toolbar 105. The bookmark name 1130, bookmark address 1140 and labels 1150 may be retrieved from the located record entry 1120 and returned to toolbar 105.

The retrieved bookmark information may be displayed in the user's browser (block 1720). Upon receipt of the bookmark information from server 130, toolbar may display a window 1820 in browser 1810 that includes the retrieved bookmark name 1130, bookmark address 1140 and labels 1150. The user may, after display of the retrieved bookmark information, edit the bookmark name 1130 or labels 1150 associated with that bookmark.

Exemplary Bookmark Publishing Process

Figure 19:
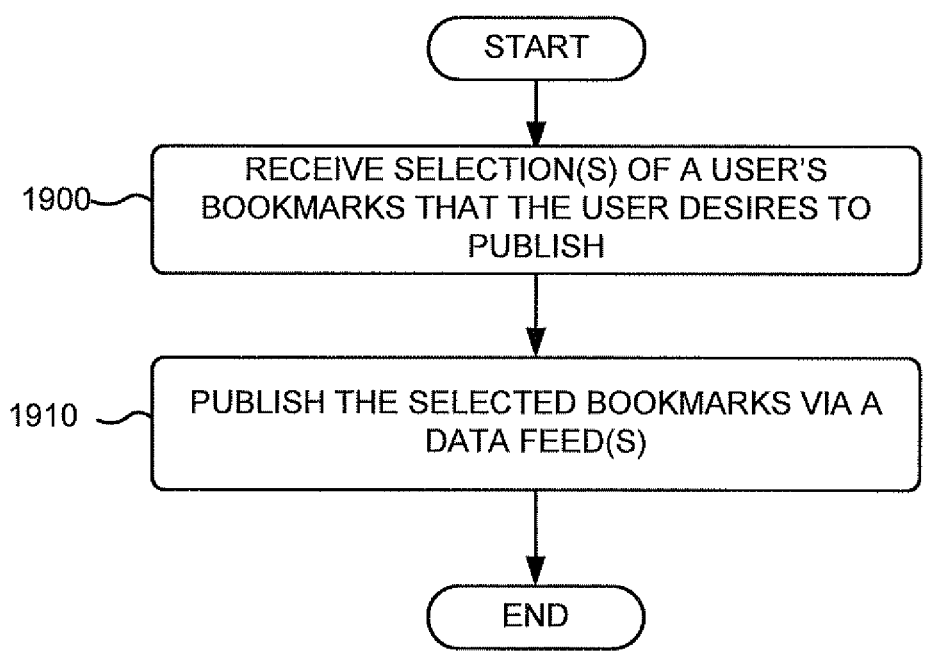
FIG. 19 is a flowchart of an exemplary process for publishing user bookmarks via data feeds.

FIG. 19 is a flowchart of an exemplary process for publishing a user's bookmarks via, for example, a data feed(s) (e.g., an Extensible Markup Language (XML) feed(s)). The process exemplified by FIG. 19 may be performed by toolbar 105 and/or server 130.

Figure 20:
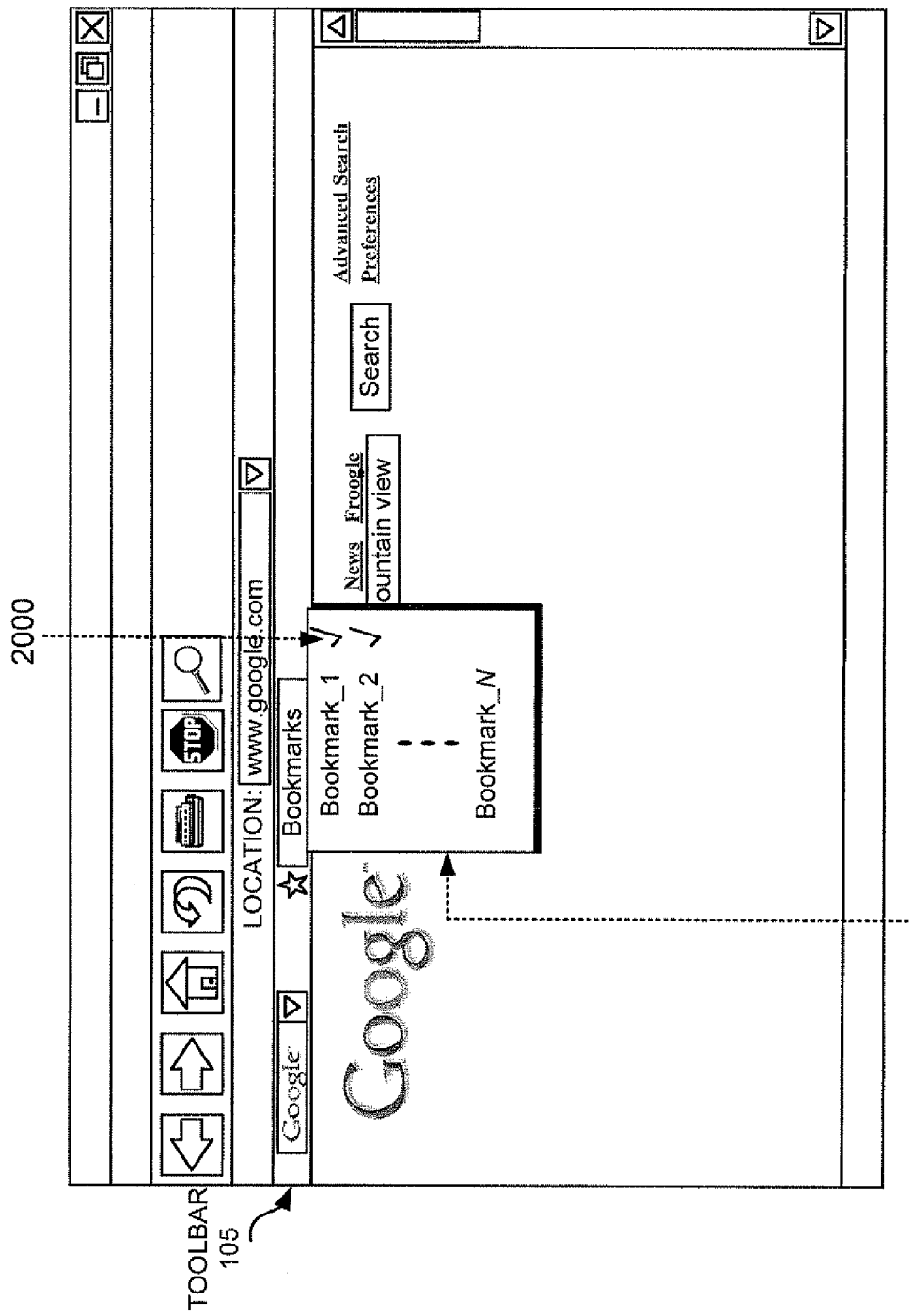
FIG. 20 is a diagram that depicts the selection of a user's bookmarks, via a window of a toolbar, that the user desires to publish via data feeds.

The exemplary process may begin with the receipt of selection(s) of a user's bookmarks that the user desires to publish (block 1900). As shown in FIG. 20, a user may select 2000 (e.g., click on using a mouse) one or more bookmarks from window 420. Each bookmark that the user selects for publication may include a visual identifier (e.g., an icon or checkmark) that indicates the selection.

The user's selected bookmarks may then be published via a data feed(s) (block 1910). For example, the user's selected bookmarks may be published via an XML feed (e.g., Really Simple Syndication (RSS) or Atom feed(s)) using network 220. The user's selected bookmarks may, for example, be published periodically via the data feed(s). The user may additionally specify when (e.g., once, daily, etc.) when the selected bookmarks should be published. Toolbar 105 may publish the selected bookmarks via the data feed(s) directly, or may notify server 130 of the selected bookmarks so that server 130 may publish the bookmarks via a data feed(s). As an example, users who subscribe to the data feed(s) may receive information regarding the user's bookmarks.

Exemplary Bookmark Sharing Process

Figure 21:
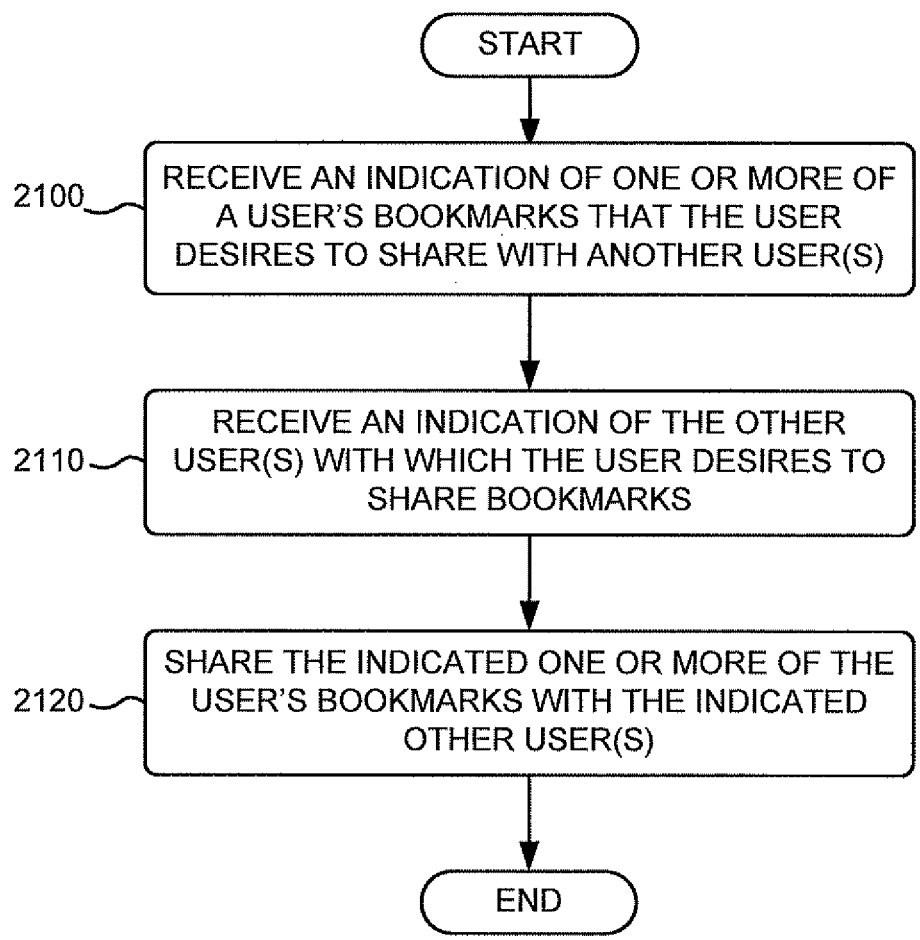
FIG. 21 is a flowchart of an exemplary process for sharing selected ones of a user's bookmarks with specifically selected other users.

FIG. 21 is a flowchart of an exemplary process for sharing a user's bookmarks with other users. The process exemplified by FIG. 21 may be performed by browser toolbar 105 possibly in conjunction with server 130.

Figure 22:
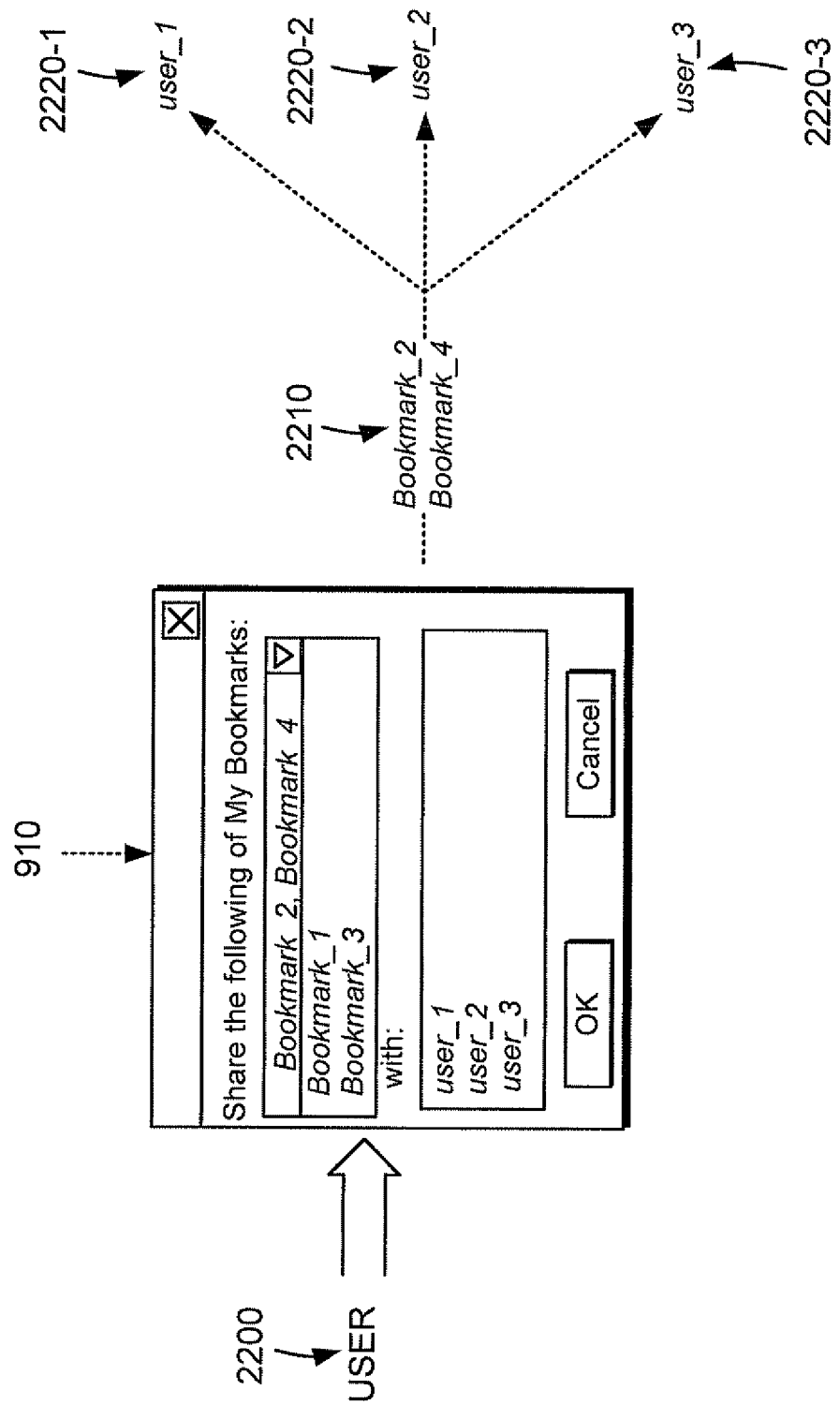
FIG. 22 graphically illustrates the exemplary process of FIG. 21.

The exemplary process may begin with the receipt of an indication of one or more of a user's bookmarks that the user desires to share with another user(s) (block 2100). For example, as previously shown in FIG. 9, a user may select "share my bookmarks" 900 from bookmark window 420 of toolbar 105 which may result in toolbar 105 displaying a window 910 that permits the user to specifically indicate which bookmarks that the user desires to share and which other users with whom the user desires to share the selected bookmarks. For example, as shown in FIG. 9, window 910 may include a bookmark identifying section 920 that permits the user to select (e.g., from a drop-down menu) the specific bookmarks that the user desires to share. FIG. 22 graphically illustrates a user 2200 selecting bookmarks (e.g., bookmark_1 and bookmark_2) in window 910 for sharing.

Indications of the other user(s) with whom the user desires to share bookmarks may further be received (block 2110). As previously shown in FIG. 9, window 910 may also include a user identifying section 930 that permits the user to select (e.g., from a drop-down menu) the other users with whom the user desires to share his/her bookmarks. FIG. 22 graphically illustrates user 2200 identifying other users user_1, user_2 and user_3 in window 910 with whom the user desires to share his/her bookmarks.

The indicated one or more of the user's bookmarks may be shared with the indicated other user(s) (block 2120). As illustrated in FIG. 22, the bookmarks 2210 selected by the user via window 910 may be associated with respective users user_1 2220-1, user_2 2220-2 and user_3 2220-3. For example, toolbar 105 may send the shared bookmarks, and the corresponding user identifiers, to server 130 for storing in respective bookmark records.

CONCLUSION

The foregoing description of implementations provides illustration and description, but is not intended to be exhaustive or to limit the implementations to the precise form disclosed. Modifications and variations are possible in light of the above teachings, or may be acquired from practice of implementations described herein. For example, while series of acts have been described with regard to FIGS. 12, 15, 17, 19 and 21 the order of the acts may be modified in other implementations. Further, non-dependent acts may be performed in parallel. The exemplary process of FIG. 12 has been described as automatically bookmarking search results based on a number of criteria. In other implementations, however, automatic bookmarking of documents may occur (i.e., without the user explicitly requesting that the documents be bookmarked) based on a navigational history associated with a user (i.e., based on documents visited or accessed by the user) in addition to automatic bookmarking of documents returned as results in search results.

It will be apparent to one of ordinary skill in the art that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects have been described without reference to the specific software code, it being understood that software and control hardware may be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by one or more processors associated with a computer device, a search query from a user;
receiving, by the one or more processors and from the user, data specifying a threshold score;
obtaining, by the one or more processors, search results related to the search query,
each of the search results corresponding to a respective document in a corpus of documents;
providing, by the one or more processors, the search results for presentation to the user;
assigning, by the one or more processors, scores to the search results based on the search query;
automatically selecting, by the one or more processors, one or more of the search results based on the scores and the threshold score; and
automatically bookmarking, by the one or more processors, the one or more of the search results.

2. The method of claim 1, where automatically bookmarking the one or more of the search results includes:
storing, in a record associated with the user, information identifying the respective documents corresponding to the one or more of the search results.

3. The method of claim 1, where automatically selecting the one or more of the search results further includes:
including, in the one or more of the search results, one of the search results having a score that is greater than the threshold score.

4. The method of claim 1, where assigning the scores to the search results further includes:
identifying a set of topics associated with the user; and
assigning the scores to the search results further based on the set of topics,
each of the one or more of the search results being associated with one or more topics in the set of topics.

5. The method of claim 4, where identifying the set of topics includes:
determining a search history associated with the user; and
identifying the set of topics based on the search history.

6. The method of claim 4, where identifying the set of topics includes:
determining, for each particular topic in a plurality of topics, a frequency at which the user accesses documents, in the corpus of documents, associated with the particular topic; and
identifying, based on the determined frequencies, the set of topics from the plurality of topics,
each topic in the set of topic having a respective frequency that satisfies a threshold frequency.

7. The method of claim 4, where identifying the set of topics includes:
receiving an input from the user; and
identifying, based on the input, the set of topics from a plurality of topics.

8. The method of claim 1, where assigning the scores to the search results further includes:
obtaining a navigation history associated with the user; and
assigning the scores to the search results further based on the navigation history.

9. The method of claim 8,
where assigning the scores to the search results further includes:
determining, based on the navigation history, respective quantities of times that the respective documents, corresponding to the search results, have been accessed by the user; and
assigning the scores the search results further based on the respective quantity of times.

10. The method of claim 1, further comprising:
publishing, to another computer device that is unassociated with the user, information identifying the respective documents corresponding to the one or more of the search results.

11. The method of claim 1, where assigning the scores to the search results further includes:
identifying respective quantities of times that the user has previously selected the respective documents corresponding to the search results in connection with other search queries; and
assigning the scores to the search results further based on the respective quantities of times.

12. A system, comprising:
a memory configured to store instructions; and
a processor configured to execute one or more of the instructions to:
receive a search query from a user;
obtain search results related to the search query,
each of the search results being associated with a respective document in a group of documents;
determine respective ranks of the search results based on the search query; and
automatically bookmark, based on the respective ranks, a highest ranking one of the search results.

13. The system of claim 12, where the processor is further to:
receive, from the user, data to specify a threshold score,
assigning respective scores to the search results, and
automatically bookmark one or more of the search results,
the one or more of the search results being associated with one or more of the respective scores that satisfy the threshold score.

14. The system of claim 12, where the processor, when determining the respective ranks of the search results, is further configured to execute at least one of the instructions to:
determine a particular topic associated with the user; and
determine the respective ranks of the search results further based on the particular topic.

15. The system of claim 14, where the processor, when determining the particular topic, is further configured to execute at least one of the instructions to:
determine the particular topic based on at least one of:
information received from the user,
other bookmarks associated with the user, or
a frequency at which the user accesses documents associated with the particular topic.

16. One or more memory devices that store instructions, the instructions comprising:
one or more instructions which, when executed by one or more processors associated with a computer device, cause the one or more processors to:
maintain a set of bookmarks associated with a user;
receive a search query from the user;
identify search results based on the search query,
the search results being ranked;
identify a highest ranking search result of the search results; and
automatically add a bookmark, associated with the highest ranking search result, to the set of bookmarks to form an updated set of bookmarks.

17. The one or more memory devices of claim 16, the instructions further comprising:
one or more instructions which, when executed by the one or more processors, cause the one or more processors to:

publish, to another computer device that is unassociated with the user, the updated set of bookmarks via a data feed.

18. The one or more memory devices of claim 16, where the one or more instructions, when executed by the one or more processors to identify the highest ranking search result, further cause the one or more processors to:
   obtain a particular topic associated with the user; and
   identify the highest ranking search result, from the search results, further based on the particular topic.

19. The one or more memory devices of claim 18, where the one or more instructions, when executed by the one or more processors to obtain the particular topic associated with the user, further cause the one or more processors to:
   identify the particular topic based on at least one of:
      information received from the user,
      a current collection of bookmarks associated with the user, or
      a frequency at which the user accesses documents associated with the particular topic.

20. The system of claim 12, where the processor is further configured to execute at least one of the instructions to:
   receive, from the user, an input associated with a particular search result of the search results; and
   associate, based on the input, a label with the particular search result.

* * * * *